US008996841B2

(12) United States Patent
Kuligowski et al.

(10) Patent No.: US 8,996,841 B2
(45) Date of Patent: Mar. 31, 2015

(54) HYPERVOLUME DATA STORAGE OBJECT AND METHOD OF DATA STORAGE

(75) Inventors: Doug Kuligowski, Maple Grove, MN (US); Mark Mansee, Vadnais Heights, MN (US)

(73) Assignee: Compellent Technologies, Eden Prairie, MN (US)

( * ) Notice: Subject to any disclaimer, the term of this patent is extended or adjusted under 35 U.S.C. 154(b) by 275 days.

(21) Appl. No.: 12/366,284

(22) Filed: Feb. 5, 2009

(65) Prior Publication Data

US 2009/0198949 A1    Aug. 6, 2009

Related U.S. Application Data

(60) Provisional application No. 61/026,626, filed on Feb. 6, 2008.

(51) Int. Cl.
*G06F 12/08* (2006.01)
*G06F 3/06* (2006.01)
*G06F 9/50* (2006.01)

(52) U.S. Cl.
CPC ............ *G06F 3/0665* (2013.01); *G06F 3/0605* (2013.01); *G06F 3/0647* (2013.01); *G06F 3/065* (2013.01); *G06F 3/067* (2013.01); *G06F 9/5077* (2013.01)
USPC ..................... 711/203; 711/162; 711/E12.016

(58) Field of Classification Search
USPC ................................................. 711/203, 162
See application file for complete search history.

(56) References Cited

U.S. PATENT DOCUMENTS

| 5,987,621 | A | 11/1999 | Duso |
| 6,216,202 | B1 * | 4/2001 | D'Errico ........................ 711/112 |
| 7,386,662 | B1 * | 6/2008 | Kekre et al. .................... 711/113 |
| 7,412,576 | B2 * | 8/2008 | Yagawa ......................... 711/161 |
| 2004/0073831 | A1 * | 4/2004 | Yanai et al. ........................ 714/7 |
| 2004/0098637 | A1 * | 5/2004 | Duncan et al. ..................... 714/6 |
| 2005/0055603 | A1 | 3/2005 | Soran |
| 2006/0161700 | A1 * | 7/2006 | Boyd et al. ....................... 710/61 |
| 2007/0038656 | A1 * | 2/2007 | Black ............................. 707/100 |
| 2007/0266215 | A1 * | 11/2007 | Okada et al. ................... 711/165 |
| 2008/0091877 | A1 | 4/2008 | Klemm |
| 2008/0109804 | A1 * | 5/2008 | Bloomstein et al. ............... 718/1 |

OTHER PUBLICATIONS

Scott Hanson, "DAS to SAB migration", Sep. 2002, http://www.ardenta.com.*

* cited by examiner

*Primary Examiner* — Aracelis Ruiz
(74) *Attorney, Agent, or Firm* — Winthrop & Weinstine, P.A.

(57) ABSTRACT

The present disclosure relates to a data storage device having a hypervolume accessible by a plurality of servers operating on two or more data storage systems, a first physical volume, associated with the hypervolume, located at a first data storage system, and a second physical volume, associated with the hypervolume, located at a second storage system. The hypervolume directs input/output (I/O) from the servers to a primary physical volume comprising either the first or second physical volume, and the primary physical volume may be changed, transparently to the servers, to the other of the first or second physical volume. The present disclosure, in another embodiment, relates to a method for moving operation of a storage device from one data storage location to a second data storage location. A hypervolume is used to redirect input/output (I/O) from the a plurality of servers from the one physical volume to another.

15 Claims, 15 Drawing Sheets

HYPERVOLUME DATA STORAGE OBJECT AND METHOD OF DATA STORAGE

CROSS REFERENCE TO RELATED APPLICATION

This application claims the benefit of U.S. Provisional Patent Application No. 61/026,626, filed Feb. 6, 2008, the entire contents of which are incorporated herein by reference

FIELD OF THE INVENTION

The present disclosure relates to apparatus and methods for a storage device containing data that is accessible by different servers. More particularly, the present disclosure relates to apparatus and methods for a storage device containing data that is accessible by different servers through different storage systems operating in the same or different locations.

BACKGROUND OF THE INVENTION

Server virtualization is a relatively new technology being used to provide a new method to host servers running a variety of operating systems/applications that share the resources of the same physical server platform. Server virtualization concepts consist of one or more physical servers (and associated resources) each hosting one or more virtual machines (guests) running various operating systems/applications. There are many advantages of using server virtualization to host the various servers in an organization that is causing more and more users to migrate their data center operations onto virtualized platforms.

VMware®, XenSource®, and Virtual Iron® are companies developing server virtualization software platforms being marketed to data center users to be used for this purpose. While the specific techniques each company has developed to perform server virtualization may be unique, the basic function of taking a server and its resources and hosting multiple virtual machines on the same server platform seem to be common across the various products.

Adding new virtual machines to an existing server platform or moving existing virtual machines from one server platform to another "on the fly" makes a compelling case for IT departments to migrate their servers to operate in a virtualized environment. It can also add some new opportunities to storage vendors to add features to their products that can support virtualized environments and to add new functionality that can be useful in a virtualized environment that did not exist previously. One can also look at the ideas/value being gained by users of server virtualization that didn't exist prior to the virtualization technology being developed and identify similar new ideas/value that can be added to storage systems products.

Thus, there is a need in the art for a storage device containing data that is accessible by different servers without the complications presented by prior data storage systems. There is a further need in the art for a storage device with the flexibility to move operation of the storage device from one location to another.

BRIEF SUMMARY OF THE INVENTION

The present invention, in one embodiment, is a data storage device having a hypervolume accessible by a plurality of servers operating on two or more data storage systems, a first physical volume, associated with the hypervolume, located at a first data storage system, and a second physical volume, associated with the hypervolume, located at a second storage system. The hypervolume directs input/output (I/O) from the servers to a primary physical volume comprising either the first or second physical volume, and the primary physical volume may be changed, transparently to the servers, to the other of the first or second physical volume.

The present invention, in another embodiment, is a method for moving operation of a storage device from one data storage location to a second data storage location comprising creating a hypervolume accessible by a plurality of servers operating at two or more data storage locations, associating a primary physical volume located at one data storage location with the hypervolume, associating a secondary physical volume located at another of data storage location with the hypervolume, and using the hypervolume to redirect input/output (I/O) from the servers from the primary physical volume to the secondary physical volume. The redirecting of the I/O from the servers is transparent to the servers.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying Figures, in which:

DEFINITIONS

Figure 1:
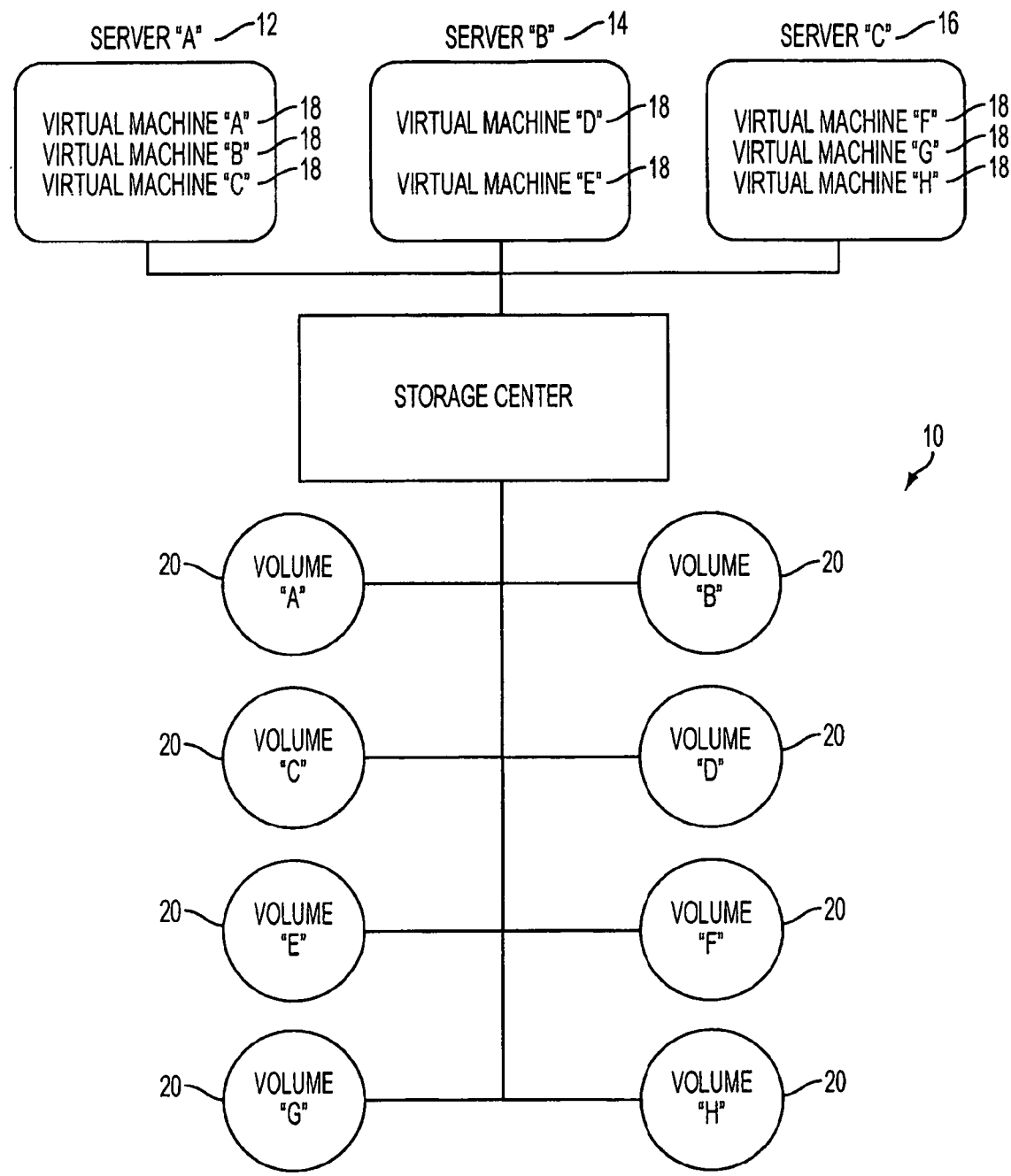
FIG. 1 is an embodiment of a virtualized computing environment.

Physical Volume, as used herein, may include a storage object to which read/write data requests can be directed to that results in read/write requests being directed to a specific set of data storage devices.

Hypervolume, as used herein, may include a storage object that can be accessed through different systems and that can store/retrieve data from different physical storage devices accessible through different systems.

Primary Hypervolume Access Point (PHVAP), as used herein, may include a hypervolume component that represents a storage system where the primary access point (location) for a hypervolume is defined. All read/write requests can be processed through the primary hypervolume access point system. In one embodiment, there may only be one primary hypervolume access point system defined for a hypervolume. The primary hypervolume access point system definition can be moved from system to system as appropriate to deal with changing access requirement of the associated hypervolume.

Secondary Hypervolume Access Point (SHVAP), as used herein, may include a hypervolume component that represents a storage system where a hypervolume is accessible through but which is not defined as the primary hypervolume access point system. All read/write requests directed at a secondary hypervolume access point system can be processed by the current primary hypervolume access point system defined for the associated hypervolume. A secondary hypervolume access point system can become the primary hypervolume access point system.

Primary Physical Volume (PPV), as used herein, may include a hypervolume component that represents the physical storage to which read/write requests are directed. The primary physical volume component may also manage the physical volume replication to secondary physical volumes defined for the hypervolume. The currently defined primary physical volume component can change from system to system as appropriate to deal with changing access requirements of the associated hypervolume.

Secondary Physical Volume (SPV), as used herein, may include physical volumes that are not currently defined as the primary physical volume in hypervolume configurations where more than one physical volume is associated with the hypervolume. Secondary physical volume components can become the primary physical volume component.

Asynchronous replication, as used herein, may include a replication method of physical volumes associated with a hypervolume that does not maintain exact real-time copies of data between the primary physical volume and secondary physical volumes.

Synchronous replication, as used herein, may include a replication method of physical volumes associated with a hypervolume that attempts to maintain exact real-time copies of data between the primary physical volume and secondary physical volumes.

Hypervolume Mirror/Replication Strategy (HVMRS), as used herein, may include the mirror/replication strategy defined for a hypervolume that is used to mirror the physical volumes associated with the hypervolume.

Hypervolume Snapshot (HVSS), as used herein, may include snapshots created by the HVMRS.

Checkpoint Snapshot (CPSS), as used herein, may include a snapshot instance that is used to provide a checkpoint for physical volume replication associated with a hypervolume.

Hypervolume Management Facility (HVMF), as used herein, may include the software which registers the definition and state of a hypervolume and all of its components and is used to manage the hypervolume operation. HVMF may provide services to systems utilizing hypervolumes and may provide the central point of control for directing the operation of a hypervolume between systems.

Primary Hypervolume Management Facility (PHVMF), as used herein, may include the HVMF system providing the primary hypervolume management facility services for a hypervolume. Hypervolume components may communicate with the PHVMF component when reporting events associated with the hypervolume or when they need up to date information about the hypervolume state.

Secondary Hypervolume Management Facility (SHVMF), as used herein, may include a HVMF system that maintains comparable information to the PHVMF so that it can take over the PHVMF services in the event the current PHVMF component for the hypervolume becomes unavailable.

De-duplication, as used herein, may include a method used for asynchronous replication to identify only the changed sectors associated with a storage page and to replicate only those sectors to a remote storage system.

Data Progression, as used herein, may include moving data gradually to storage space of appropriate cost, including moving data from higher cost storage to lower cost storage and moving data from lower cost storage to higher cost storage. The cost of storage may be determined in various ways, including but not limited to, determining the cost of storage using the cost of the physical media and the efficiency of physical disks and/or RAID devices. In some embodiments, Data Progression may include moving non-recently accessed data to lower cost storage. Data Progression is further disclosed in U.S. patent application Ser. No. 10/918,329, filed Aug. 13, 2004 and titled "Virtual Disk Drive System and Method" and U.S. patent application Ser. No. 11/753,357, filed May 24, 2007 and titled "Data Progression Disk Locality Optimization System and Method," each of which is hereby incorporated by reference herein.

Storage tiers, as used herein, may include a plurality of tiers of data storage tailored to fit the specifications of a storage system. The storage tiers may be differentiated by factors such as disk class (e.g., 15K, 10K, FATA, SATA, etc.), RAID level (e.g., 10, 5, 6, etc.), and disk locality (e.g., outer track). See U.S. patent application Ser. No. 11/753,357, filed May 24, 2007 and titled "Data Progression Disk Locality Optimization System and Method," which was previously incorporated by reference herein.

Enterprise Manager/Enterprise Manager System, as used herein, may include an administrative tool or administrative tools used for managing different business or enterprise systems and applications, including but not limited to, application management, asset management, network management, database management, data storage management, virtualization management, etc.

DETAILED DESCRIPTION

The present disclosure relates to apparatus and methods for a storage device containing data that is accessible by different servers. More particularly, the present disclosure relates to apparatus and methods for a storage device containing data that is accessible by different servers through different storage systems operating in the same or different locations. The present disclosure further provides a storage device with the flexibility to move operation of the storage device from one location to another.

A new class of volume, referred to herein as a hypervolume, provides features that have previously been unattained in virtualization and data storage systems. A hypervolume may be managed across different data storage systems, while representing the same set of server data. A hypervolume may comprise a plurality of physical volumes located on a variety of storage systems. The data may be maintained, managed, mirrored, etc. on different sets of physical storage. Movement of hypervolume components may be transparent to the operational servers.

The concept of hypervolumes came about from the needs of virtualized computing environments (e.g., VMware®, XenSource®, etc.) that can move the operation of virtual machines from one location to another. It seemed appropriate that a storage device with similar flexibility would be desired to complement the virtualized computing features. However, keeping most of the features currently found in data storage products is also desirable.

Features of Virtualized Computing Environments

FIG. 1 shows an example of a virtualized computing environment 10 consisting of three physical servers (Servers A 12, B 14, C 16) hosting eight virtual machines 18 (Virtual Machines A, B, C, D, E, F, G, H). For illustration purposes only, this example includes one disk 20 (Volumes A, B, C, D, E, F, G, H) per Virtual Machine with Virtual Machine A using Volume A, Virtual Machine B using Volume B, etc. However, it is recognized that any suitable number of disks per Virtual Machine may be used. Virtual Machines A, B, and C may be hosted on Server A 12. Virtual Machines D and E may be hosted on Server B 14. Virtual Machines F, G, and H may be hosted on Server C 16. All three physical servers 12, 14, 16 may have connectivity to all eight volumes on the storage system. For this example, we will assume that all three physical servers 12, 14, 16 are equivalent, allowing the virtual machines 18 running on them to be moved between servers without any restrictions.

Figure 2:
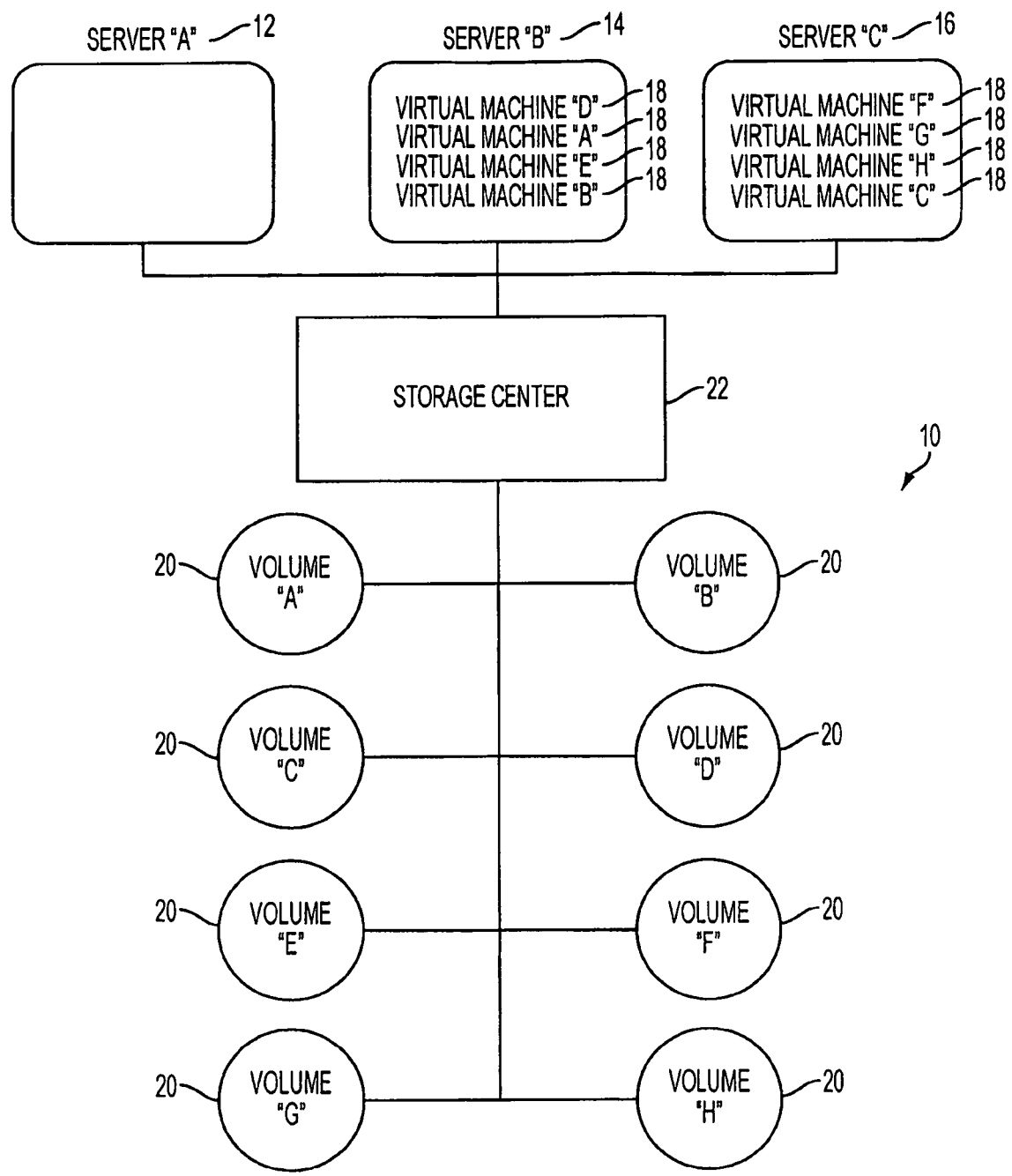
FIG. 2 illustrates virtual machines moved from one server to another in the embodiment of a virtualized computing environment shown in FIG. 1.

FIG. 2 shows the Virtual Machines hosted on Server A 12 being moved to the other two Servers 14, 16 in order to, for one example, shutdown Server A 12 for maintenance.

The VMware® product has a feature called VMotion® that can move virtual machines from one physical server to another of equivalent resources "on the fly" without halting the application. One of the requirements for this movement of Virtual Machines to be performed "on the fly" is connectivity to the storage devices used by the Virtual Machines by all physical servers in the environment.

However, there are more complex examples where this is not the case. In the example above, the storage system 22 must remain operational in order for the virtualized environment 10 to continue to operate. With a dual controller storage system 22, one storage system controller can be brought down and the work will transfer over to the other controller. However, the entire storage system cannot be taken out of service and still allow the virtual server environment to continue to function. So, for the case where virtualized servers are located in different data centers, allowing Virtual Machines 18 to be moved from physical servers operating in one data center to physical servers operating in the other data center, new functionality may be added to the storage system 22 in order to provide seamless data storage services to the volumes used by the Virtual Machines 18 in different data centers connected through different storage systems 22.

Figure 3:
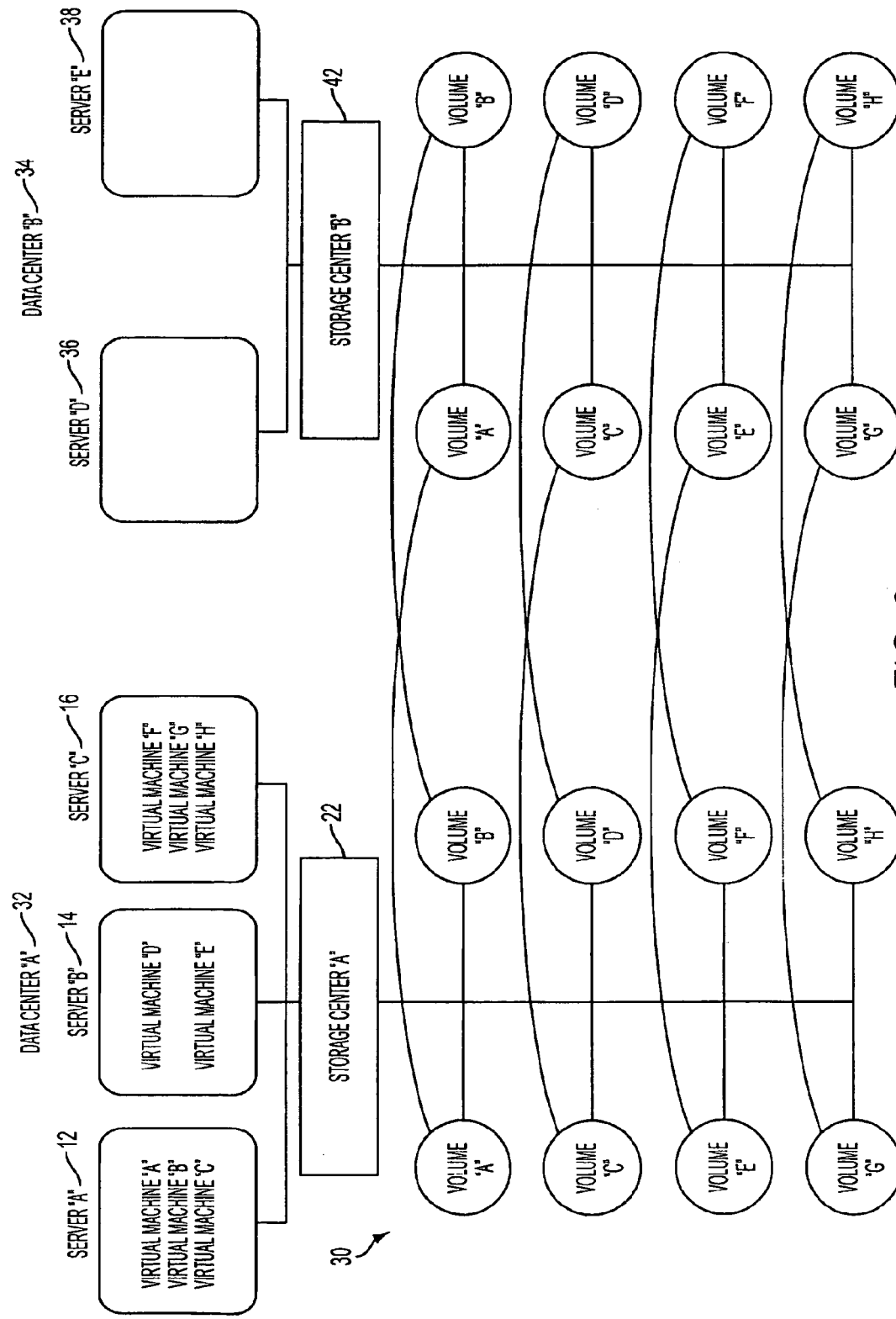
FIG. 3 is an embodiment of a virtualized computing environment having multiple data centers.

In an embodiment of a multiple data center virtualized computing environment 30 illustrated in FIG. 3, data center A 32 may host the production data center used for day to day IT operations. Data center B 34 may be a disaster recovery center to host the production IT services when needed. Data center B 34 may contain two physical servers (Servers D 36, E 38), or any other suitable number of physical servers, which may be equivalent to the physical servers running in the production data center in order to allow movement of virtual machines from any physical server in data center A 32 to any physical server in data center B 34. A variation of this setup could utilize the physical servers in data center B 34 to host virtual machines during normal operation and then move virtual machines between data centers as needed for continuous IT operation.

Figure 4:
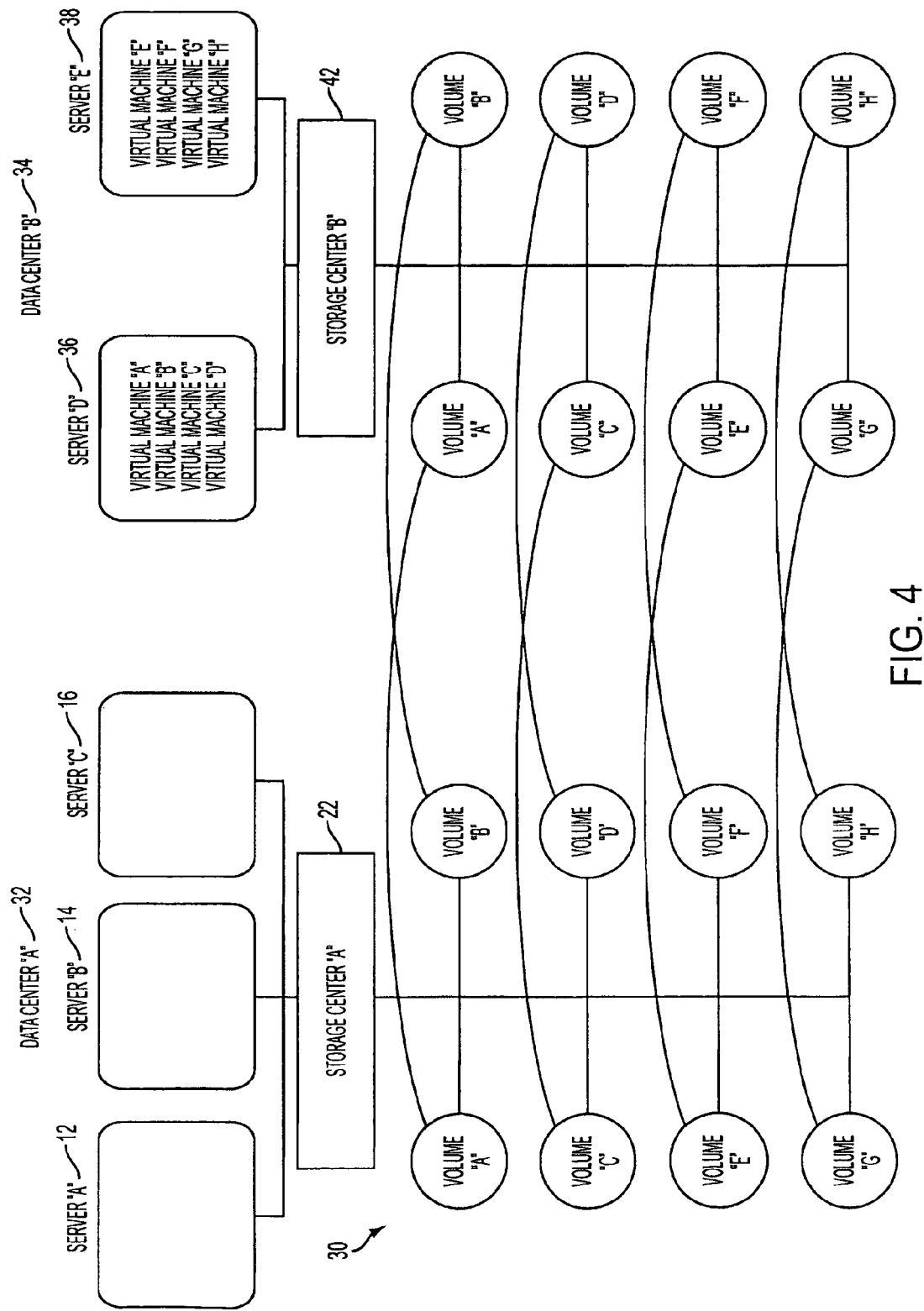
FIG. 4 illustrates virtual machines moved from one server to another in different data centers in the embodiment of a virtualized computing environment shown in FIG. 3.

FIG. 3 shows a second storage system B 42 residing at data center B 34 with the illusion of all volumes hosted on storage system A 22 in data center A 32 also available through storage system B 42 located in data center B 34. This is one portion for which the concept of a hypervolume is proposed. The physical servers operating in data center B 34 may have access to the same data/volumes as the physical servers operating in data center A 32 to allow "on the fly" movement of virtual machines from servers operating in data center A 32 to servers operating in data center B 34. The use of iSCSI connections between servers located in data center B 34 and the storage system A 22 located in data center A 32 may be sufficient to meet a requirement that physical servers operating in data center B 34 have access to the same data/volumes as the physical servers operating in data center A 32. But part of the requirement may also include that the equipment in data center B 34 may be able to continue operations without access to any equipment located in data center A 32 (including the storage devices attached to storage system A 22). This may include that the data residing on the eight volumes hosted by storage system A 32 be replicated and available for use by storage devices attached to storage system B 42 and logic added to manage this between the two storage systems. In addition, the point of data use can change in the system, meaning that the point of use for the data on Volume A (which is being used by Virtual Machine A in this example) may change from storage system A 22 to storage system B 42 when Virtual Machine A moves from operating on Server A 12 to operating on Server D 36, as shown in FIG. 4. When the point of data use changes for a volume, the replication of the data being written to that volume may need to change direction to reflect the change in point of use of the data.

FIG. 4 shows all eight virtual machines moved to the two servers 36, 38 located in data center B 34, allowing all of the systems in data center A 32 to be, for example, taken out of service as needed. This might be done to facilitate movement of the production services to another data center because of a pending disaster (e.g., hurricane, etc.). What this figure doesn't represent is the need for the virtual machine data resident on the eight volumes to be hosted by the storage system B 42 in order to allow the storage system A 22 to be taken out of service. Thus, the point of data use for the eight volumes in FIG. 4 is now the storage system B 42. The data read/written by the virtual machines to the volumes can utilize storage devices located in data center B 34 and connected through storage system B 42, and the data written to the volumes by the two servers hosting the eight virtual machines in data center B 34 may be replicated by the storage system B 42 back to the storage system A 22.

Typically, the movement of virtual machines in a virtualized computing environment occurs gradually over time. Thus, not all eight virtual machines would be moved from data center to data center in one operation but rather one virtual machine at a time. During the movement of a virtual machine from one server to another, the data residing on the volume may be updated and accessed by different servers at different times during the move operation. Once the virtual machine move has completed, the point of data use can change and may be accommodated by the storage system.

At some point in time, the virtual machines may normally be moved back to their original operational environment in data center A 32 at which point the point of data use may change back to the original location to accommodate this change.

Thus, some features of the disclosure herein include providing a data storage device to multiple servers that can be accessed through different storage systems and that can maintain the storage services with physical storage devices attached to different storage systems and can adjust the point of data use as needed to efficiently maintain the data presented to the servers accessing the data.

Additional Features

The features described in the previous section illustrate the support of a distributed virtualized computing environment using separate storage systems hosting the data at the different sites. There are other applications for similar functions in different environments. Some of these other applications are described in this section.

Figure 5:
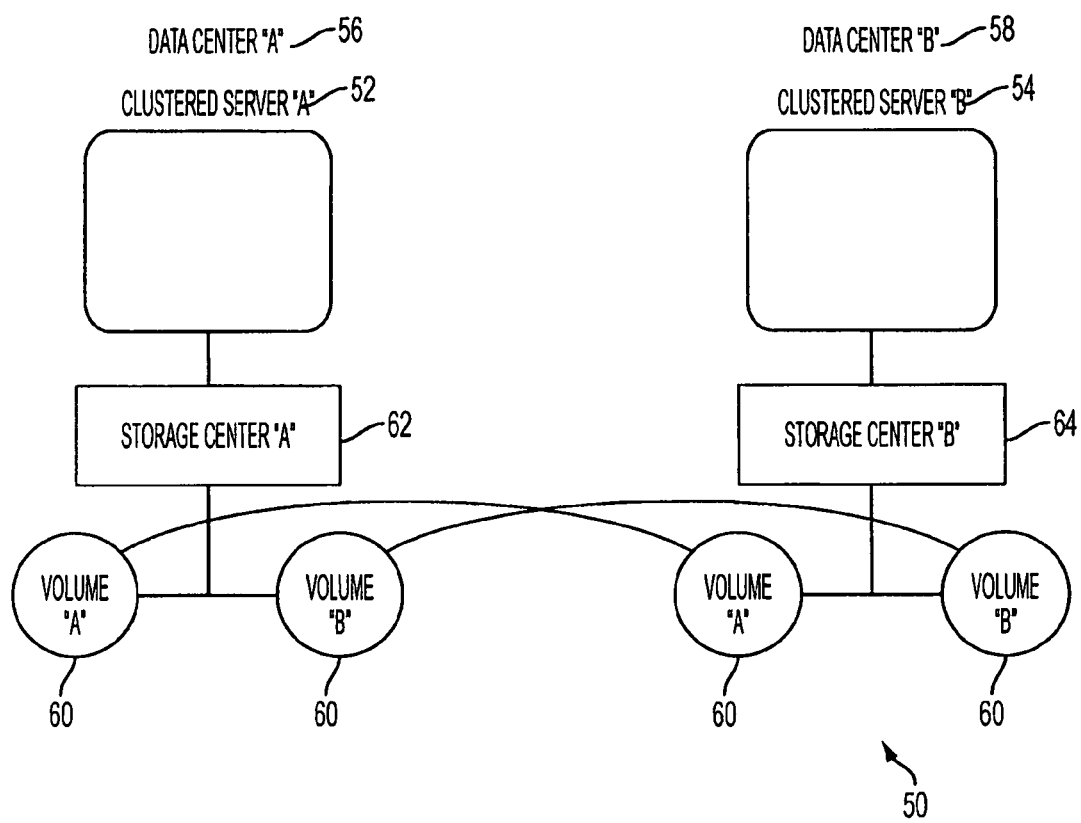
FIG. 5 is an embodiment of a distributed clustered server.

One configuration that has a similar need is a distributed clustered server 50 that contains completely separate equipment at different locations that can provide continuous operations in the event one location becomes inoperative. One embodiment of this configuration 50 is shown in FIG. 5.

Two servers (Clustered Servers A 52, B 54) may be located in different data centers 56, 58 and may be running with two volumes 60 (Volumes A, B) configured on the storage systems. In the event data center A 56 becomes inoperative, the clustered server 54 in data center B 58 can pick up the load and continue running with the volumes hosted on storage system B 64. When the systems at data center A 56 become operational again, operations can be moved back to data center A 56 using the storage behind storage system A 62 as the primary storage.

Figure 6:
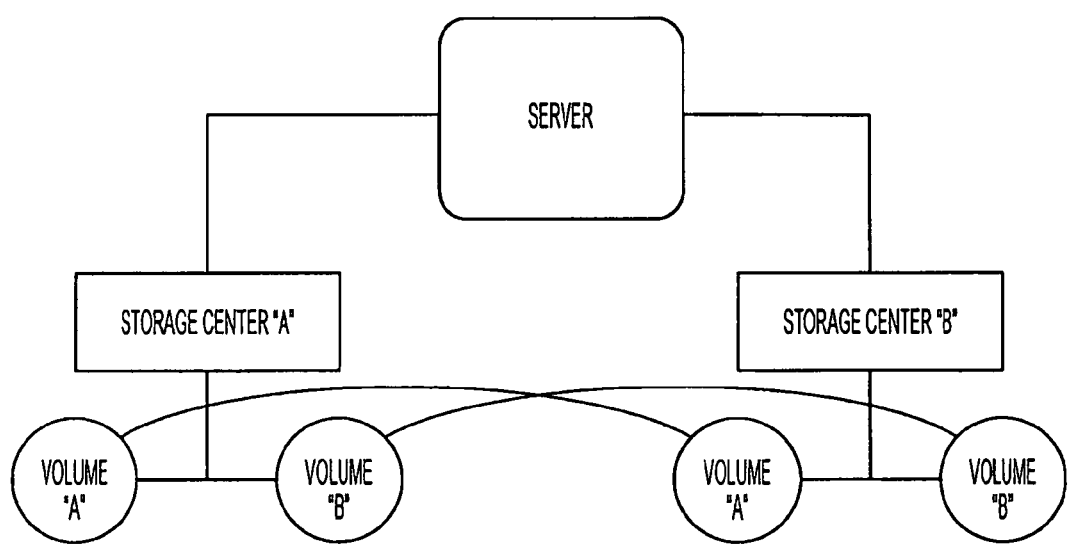
FIG. 6 is an embodiment of an added redundancy server configuration.

Another use of this feature could be to add another dimension of redundancy to a system configuration than is currently available. One embodiment is shown in FIG. 6.

Figure 7:
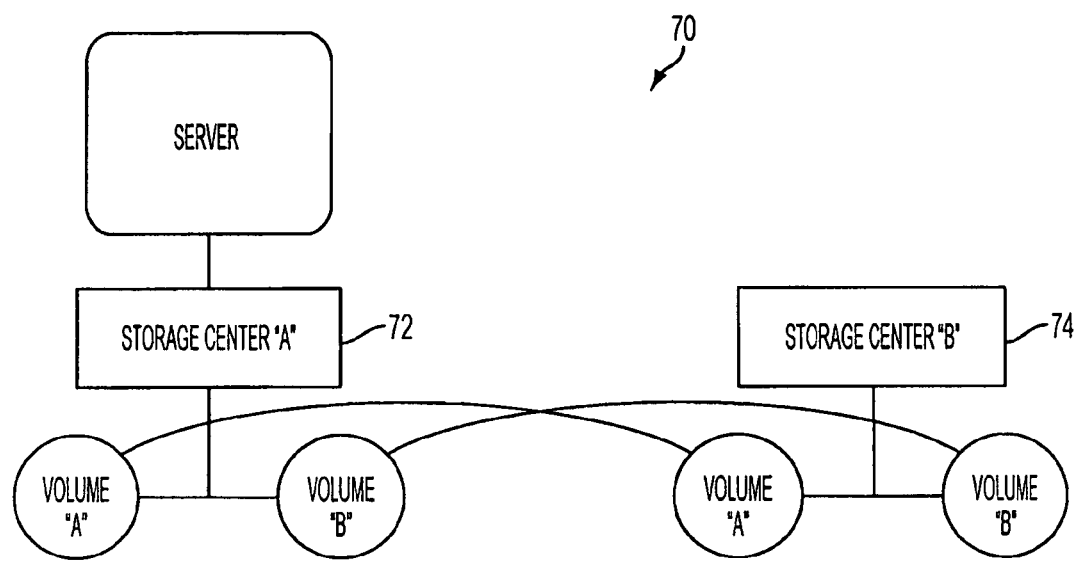
FIG. 7 is a further embodiment of an added redundancy server configuration.

Another embodiment 70 of this idea is shown in FIG. 7. storage system A 72 may replicate Volumes A and B to storage system B 74. However, the server I/O may utilize the storage devices attached to storage system A 72 (e.g., using synchronous replication). In the event a non-recoverable error occurs on the data on Volumes A or B attached to storage system A 72, the logic can direct server I/Os to utilize the comparable volume on storage system B 74. When the problem on storage system A 72 is determined and fixed and the data is replicated back to the storage devices attached to storage system A 72, server I/Os can once again be directed to the storage devices attached to storage system A 72.

Figure 8:
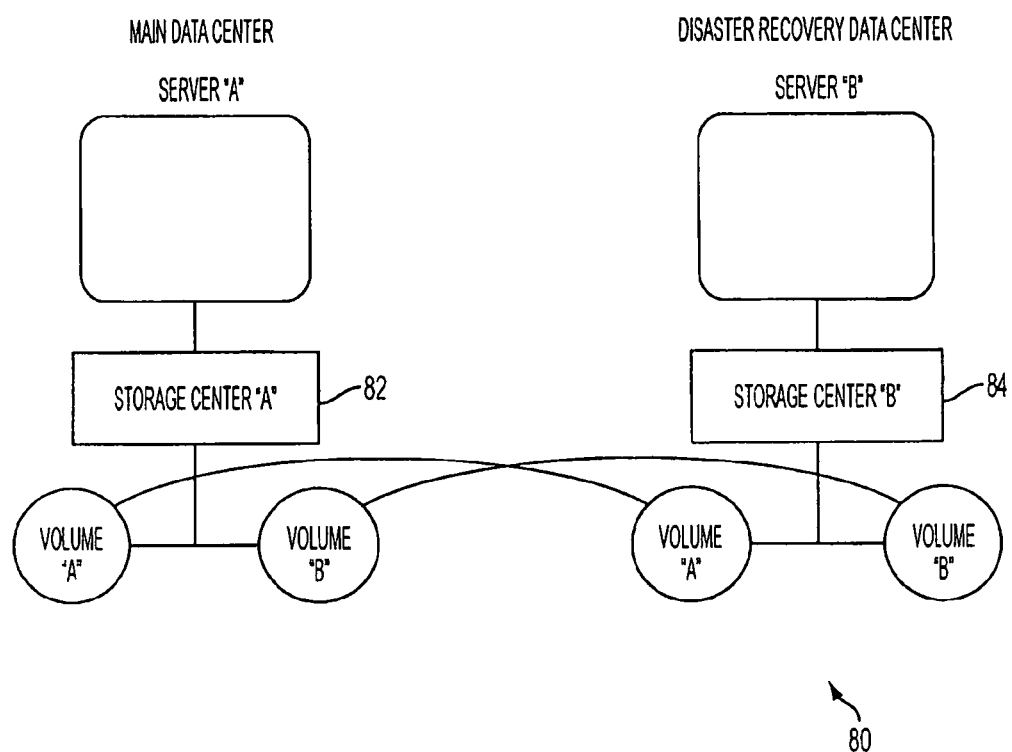
FIG. 8 is an embodiment of a disaster recovery server configuration.

In a disaster recovery configuration 80, data can be replicated from storage located at a production site to storage located at a site that will take over operations when a disaster occurs (disaster recovery site). One embodiment is shown in FIG. 8. During normal production, server data may be read/written to the storage devices attached to storage system A 82 and the data written by the server may be replicated to comparable volumes serviced by storage system B 84. The replication can use either synchronous or asynchronous methods. When a disaster is declared, operations may be transferred to systems located at the disaster recovery site where they may run until the disaster has passed. During this time, servers operating at the disaster recovery site may utilize the data stored on devices attached to storage system B 84. While operations continue at the disaster recovery site, new data written to the volumes may be replicated back to storage system A 82 at the main data center to allow migration back to the main data center. This may occur in real-time or sometime later when the disaster has passed and the main data center can become active again. Once the disaster has passed and the main data center becomes operational again, production can migrate back to the servers located in the main data center using the storage devices attached to storage system A 82.

Hypervolume Properties

A new class of volume may allow the features specified in the previous sections. This new class of volume is referred to herein as a hypervolume.

A hypervolume may operate from/on different storage systems where the data is read/written to different sets of storage devices. A hypervolume may be managed across different storage systems while representing the same set of server data. In one embodiment, a hypervolume may comprise of one or more physical volumes residing on various storage systems where the data is maintained/managed/mirrored on different sets of physical storage that are defined for the hypervolume.

A hypervolume may be useable/configurable on a storage system other then where the physical storage for the volume is physically attached. Servers accessing the same hypervolume through different storage systems can operate the same as if they accessed the same volume through the same storage system. As server access "moves" around the environment, the hypervolume operating environment can adapt to provide connectivity and access to their data in the most efficient manner. The movement of the hypervolume components may be transparent to the operational servers. Thus, events such as device reservations and task management can be managed for a hypervolume across storage system boundaries in a similar manner as if these events occurred all on the same storage system.

Hypervolumes may utilize replication strategies to mirror the data between physical volumes associated with a hypervolume. Different replication strategies can be defined that provide different mirroring characteristics as needed by the user. At times, replication strategies can be changed in order to allow an operational event to take place. This could all be done automatically by the hypervolume logic and may be transparent to the servers accessing the data. There may be logic added to track hypervolume access patterns and to automatically adjust the hypervolume operational environment to maximize the efficiency of the hypervolume.

A hypervolume may duplicate the functions of a physical volume. This implies actions such as increasing the size a hypervolume requires to be supported. Snapshots may also be supported, and the snapshots may be managed at the hypervolume level and physical volume level and may be replicated on all storage systems hosting physical volumes for a hypervolume.

Because hypervolumes can be accessed from any number of storage systems, additional access controls can be considered in order to secure access to hypervolumes and to limit/prevent accidental access to a hypervolume.

Because hypervolumes can be configured to utilize more than one physical volume as a base, changes may be made to the Data Progression logic for physical volumes associated with hypervolumes to operate differently. Because the primary physical volume associated with a hypervolume can move from system to system, the Data Progression decisions for the physical volumes associated with a hypervolume can be made globally from the primary physical volume to the secondary physical volumes to reflect the possibility of having the primary physical volume component moved at any time.

Hypervolumes can be configured before they are used by servers. Configuration of a hypervolume may be different than for a physical volume. A Physical volume definition may require size and storage tier definitions. Hypervolume definition may include components to be defined. Deletion of a hypervolume on a particular storage system may not infer the deletion of the hypervolume definition. It may only mean the instance of the hypervolume is no longer associated with that storage system. The deletion of a hypervolume, in one embodiment, may only occur when all users of the hypervolume have ended. Special controls may be needed to protect the accidental deletion of a hypervolume in the system.

Configuration changes may take place for a hypervolume after it has been defined and used. An example of a configuration change for a hypervolume would be the addition of another physical volume to a hypervolume. The replication strategy defined for the hypervolume can be changed as well. Because a number of elements may need to be maintained in order for the hypervolume to continue to be useful, it may not be acceptable to require a hypervolume to be terminated and reformed in order to make a configuration change. Therefore, all configuration changes can be allowed without disrupting the operation of the hypervolume.

Read and write cache can be supported for hypervolumes in a manner similar to their use for physical volumes. They may be configurable the same as for physical volumes. There may be times during the operation of a hypervolume that read/write cache operation may be altered to allow a change in the operating environment of the hypervolume, but once the change has completed, the defined read/write cache settings may be reestablished.

Hypervolumes may be managed from many storage systems. Special management support may be included to define and manage hypervolumes. A new Hypervolume Management Facility (HVMF) may provide the basis for managing hypervolumes on a system wide basis.

In many hypervolume configurations, the performance of a hypervolume may be comparable to the primary physical volume associated with it. There may be times though when the performance of a hypervolume may be less than its physical volume components.

Physical Volume Properties when Associated with Hypervolumes

Physical volumes may contain the definition of a volume that can be configured for use by servers to store data on. These volumes may be what hypervolumes are based on. Some properties of physical volumes may change when they are associated with a hypervolume. This section will discuss these properties.

One function of the physical volume may be to provide physical storage for use with the hypervolume. Physical volumes may operate as either the primary physical volume or as secondary physical volumes when associated with a hypervolume. At least one physical volume may be defined for use by a hypervolume. In many cases, two physical volumes will be defined for a hypervolume. In further embodiments, more than two physical volumes may be associated with a hypervolume.

When a physical volume is associated with a hypervolume, it may not be mapped for use directly by a server. It may be used for the hypervolume to which it is configured. If a physical volume is mapped for use by a server when it is defined to be used for a hypervolume, the current mapping may be changed. A physical volume, in one embodiment, may be associated with one hypervolume at a time.

Read/write cache settings may be allowed on physical volumes. Some restrictions of cache may be necessary depending on the operational state of the hypervolume. The user can define the basic cache settings during definition of the hypervolume operational settings.

Architectural Design Description

Figure 9:
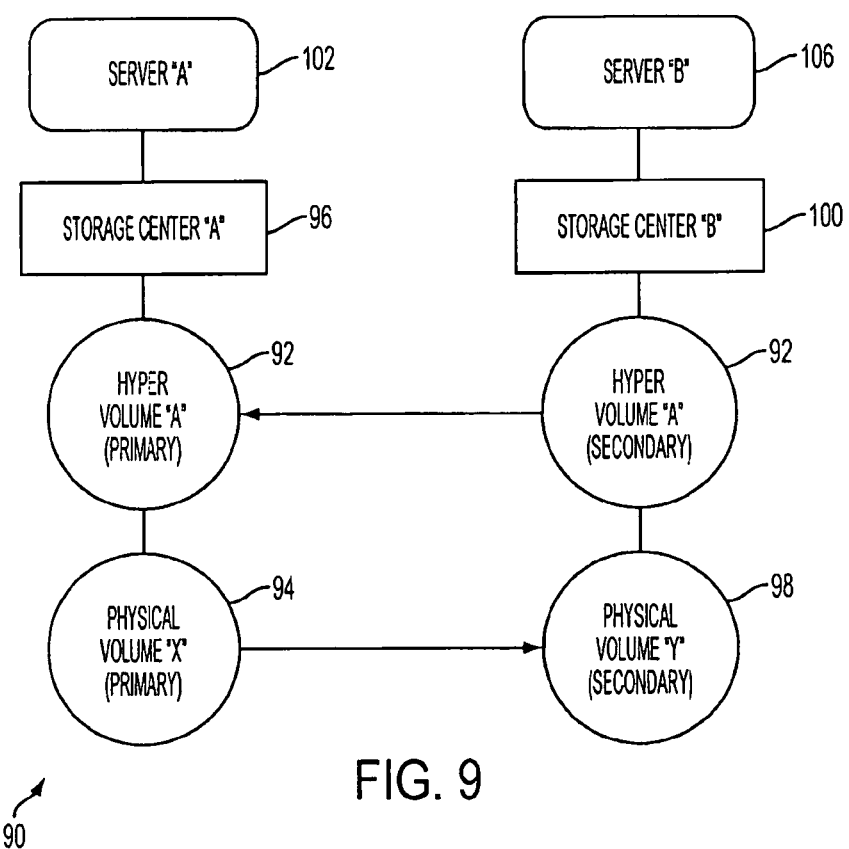
FIG. 9 is a hypervolume configuration in accordance with one embodiment of the present disclosure.

A hypervolume may include a storage object that can be accessed by servers through different storage systems and that can utilize storage devices attached to different storage systems. One embodiment of a hypervolume configuration 90 is illustrated in FIG. 9.

Hypervolume A 92 may be defined to utilize two physical volumes as the base storage devices. Physical volume X 94 may reside on storage system A 96 and may be defined as the current primary physical volume for this hypervolume. Physical volume Y 98 may reside on storage system B 100 and may be defined as a secondary physical volume for the hypervolume. An access point to Hypervolume A 92 may be defined for Server A 102 through storage system A 96. Another access point to Hypervolume A 92 may be defined for Server B 106 through storage system B 100. Hypervolume A 92 may represent the same storage device to both Servers A 102 and B 106 as if they were connected to the same volume through the same storage system. Because physical volume X 94 is defined as the primary physical volume for Hypervolume A 92, all server I/Os may be directed to the storage associated with physical volume X 94. Any data written to Hypervolume A 92 may not only be written to the primary physical volume but may also be replicated to physical volume Y 98 and any other secondary physical volumes that might be defined for the Hypervolume 92. The replication of writes to secondary physical volumes may utilize the hypervolume mirror/replication strategy defined for the hypervolume, discussed in more detail below.

Hypervolumes may have a defined primary access point for the hypervolume. In the example embodiment 90 in FIG. 9, the primary access point may be defined as storage system A 96. All server I/Os directed to a hypervolume may be processed at the primary hypervolume access point defined for the volume. This may coordinate access for multiple servers to the same device in the system; much like could occur if these two servers were mapped to the same volume on the same storage system. So, in the example FIG. 9, I/Os issued by Server B 106 to Hypervolume A 92 can to be forwarded to storage system A 96 to be processed.

One of the properties of a hypervolume may include that the primary access point for a hypervolume can be moved between storage systems. It may be most efficient if the primary access point were defined on the storage system where the most server I/Os were being received. Many configurations where different servers have the need to access the same storage device, one server accesses the device at a time. So, in the example FIG. 9, Servers A 102 and B 106 might be virtualized servers running VMware®, for example, with Hypervolume A 92 containing the data for a virtual machine running on Server A 102. If this virtual machine were to be moved to run on Server B 106, it may make sense to move the primary access point for the hypervolume to be storage system B 100 when the virtual machine is moved.

Another property of a hypervolume that has more than one physical volume associated with it is that the primary physical volume can be moved as needed. In FIG. 9, the primary physical volume may be defined to be physical volume X 94 hosted on storage system A 96. This may make sense if the primary access point for Hypervolume A 92 is storage system A 96. With the primary physical volume defined as physical volume X 94, storage system A 96 may replicate data written to the Hypervolume 92 over to physical volume Y 98 on storage system B 100 to keep the physical volumes mirrored. When the primary access point for the Hypervolume 92 is changed to storage system B 100 because the virtual machine using the volume has moved to run on Server B 106, it may make sense to move the primary physical volume to be defined as physical volume Y 98 on storage system B 100 and replicate the data being written to the Hypervolume 92 from physical volume Y 98 to physical volume X 94.

In the event a storage system hosting a physical volume defined for a hypervolume becomes inoperative, the working system can track the changes made to the primary physical volume while the system was out of service. When it comes back into service, the replication logic can bring the physical volume mirrors back into sync with each other. Once the physical volumes are synchronized, the primary physical volume can once again be moved for the hypervolume as necessary to optimize performance.

The discussion above is meant to be an overview of what a hypervolume comprises and how it can function to support virtualized computing environments. Below describes, in more detail, how a hypervolume can be managed and used. To facilitate this discussion, it is broken down into four sections: 1) defining a hypervolume, 2) configuring a hypervolume for use, 3) controlling the operation of a hypervolume, and 4) monitoring a hypervolume. Subsequent sections will discuss additional elements of the hypervolume operation.

HYPERVOLUME DEFINITION

A hypervolume may be defined to the system before it can be configured for use. One or more of the following components can be defined for a hypervolume:

- System-wide name
- Primary physical volume id (e.g., system id, volume id)
- Secondary physical volume ids (e.g., system id, volume id)
- Hypervolume access rights definition to limit access to hypervolume to certain storage systems and/or certain servers.
- Hypervolume write-cache enabled/disabled
- Hypervolume read-cache enabled/disabled
- Initial primary hypervolume access point (e.g., system id)
- Hypervolume mirror/replication strategy (HVMRS) and associated parameters if secondary physical volumes defined
- Define hypervolume policy parameters (such as whether to automatically move the PPV to the SPV on PPV failure, how to handle a fractured hypervolume, automatic PVV movement based on access patterns, etc.)
- Register hypervolume definition to a hypervolume management facility. If so, define the hypervolume management facility (HVMF) to register hypervolume with.
- Hypervolume management facility will serve as the clearing authority for configuration to use operations, monitoring and control operations of the hypervolume. (Note: This facility could be a separate management system or could be a storage system.)
- Define primary/secondary hypervolume management facility
- Establish associations with physical volumes. If not allowed, the hypervolume may not be able to be defined. Associated physical volumes may not be zone mapped to any servers. If they are, what to do? For example, one possibility is to re-zone the hypervolume in place of the physical volume on the fly.
- Use the Enterprise Manager to provide hypervolume management facility services One or more of the above list of components may be optional and/or default values may be used in the absence of defined values. The above list of components is not limiting nor exhaustive.

The system-wide name may specify a unique hypervolume name that can be used to reference a hypervolume in the system. The primary physical volume id component may specify the initial physical volume that is to serve as the primary physical volume for the hypervolume. The system id and volume id of the physical volume, in one embodiment, may be required. The size of the specified primary physical volume may define the size of the hypervolume that is being defined. The properties associated with the makeup of the physical volume may remain unchanged. Thus, the storage tiers and progression policy defined for the primary physical volume may remain the same. If the specified primary physical volume is currently mapped to a server when the hypervolume using it is defined, that mapping can be terminated/changed during the definition of the hypervolume. It may be desirable (if allowed) to remap the server to use the newly defined hypervolume in place of the physical volume to allow seamless upgrade to use of a hypervolume that is active. In the event the server remapping is not allowed because of the hypervolume definition, the hypervolume definition may fail and the user can unmap the physical volume from the active server before it is used to define the hypervolume.

Secondary physical volume ids may be optional at the time of hypervolume definition. In one embodiment, it may be desirable to not allow any secondary physical volumes to be defined initially, but to allow them to be added to the definition after the hypervolume has been initially defined. The hypervolume access rights definition may be optional and, in a further embodiment, may be removed from initial definition time and added after the hypervolume has been defined. These access rights may provide the criteria to be used by the system when a user is configuring a hypervolume for use by a server. The hypervolume write-cache enabled/disabled component may be optional and may define whether write-cache is to be used for data written to the hypervolume. If not defined, a default value can be used. The use of write-cache for hypervolumes may be similar to its use for physical volumes with the exception that when enabled, write-cache may only be enabled on the system where the primary hypervolume access point is currently defined. When the primary access point for a hypervolume is being moved, write-cache may temporarily be disabled while the movement is taking place. The hypervolume read-cache enabled/disabled component may be optional and may define whether read-cache is to be used for data read from the hypervolume. If not defined, a default value can be used. The use of read-cache for hypervolumes may be similar to its use for physical volumes with the exception that when enabled, read-cache may only be enabled on the system where the primary access point is currently defined. When the primary access point for a hypervolume is being moved, read-cache may temporarily be disabled while the movement is taking place.

The initial primary hypervolume access point component, in one embodiment, may be a required value when creating a hypervolume definition. This value may specify the storage system id where the primary hypervolume access point is to be defined. If a secondary physical volume is defined for the hypervolume, the hypervolume mirror/replication strategy component may be specified to define how the replication of data from the primary physical volume and the secondary physical volumes is to be managed. If a secondary physical volume is not defined during hypervolume definition and if one is added to the hypervolume in the future, this component may also need to be defined at that time.

The hypervolume policy parameters component may be optional. In one embodiment, a default value may not be defined. This component, if used, may define to the logic how to manage the components of the hypervolume when certain events occur in the system. Some policies may include automatically changing the PPV in the event the current PPV fails, automatically moving the primary hypervolume access point when access patterns of the hypervolume change, or defining what to do when an event occurs that causes the hypervolume to become fractured. As can be seen, multiple policy decisions may be appropriate to allow the user to better define what decisions the logic should make when problems occur in the system.

The hypervolume definition information may be saved and made available to potentially multiple systems in the operational environment. In one embodiment, a storage system may be defined to manage this information (either one that is associated with the hypervolume or not). In another embodiment, this service may be provided on a centralized system that could function regardless of the state of the storage systems on which the hypervolume and its components are operating on. The hypervolume management facility (HVMF), which is where these services may be managed, can be defined for the hypervolume. If a hypervolume definition is to be made on the system on which the HVMF services are to be provided, then the definition may be implied. If not, then the creator can specify the id of the system which will provide these services for the specified hypervolume. The HVMF system may also manage the state of the components of the hypervolume and may be the system through which control functions for the hypervolume will be processed and information about the hypervolume operation can be monitored from. These services may be replicated on redundant systems so that they are available regardless of problems in the system. As such, if the system on which the HVMF does not provide a transparent redundant system, then a secondary HVMF system could be defined for the hypervolume to be used when the primary HVMF system becomes inoperative.

At the point in time when the hypervolume is to be created, the systems on which components of the hypervolume exist may be notified of this object creation. Validation of these components and their availability may be performed and the hypervolume creation may fail if any components cannot be used as specified. If the specified components exist and are available for use by the hypervolume, these systems may make the appropriate changes in their operating environment to reserve the components for use by the hypervolume as defined by the creator. Additionally, the primary hypervolume access point system may establish unique access to the primary physical volume defined for this object. If this cannot be established, the hypervolume definition may fail. If the primary physical volume was mapped for use by a server, either that server can be remapped to the newly created hypervolume that has the physical volume defined for use by the hypervolume, or the hypervolume creation may fail. The user may unmap the physical volume from the server and then attempt to create the hypervolume once again. In one embodiment, it may be imperative that the primary physical volume provide unique access for use by the hypervolume. However, if a server is active with that physical volume, it may not be desirable for the system to take access to the volume away and risk the failure of the server. A more detailed discussion of the associations between hypervolume components is provided later in this disclosure.

Once a hypervolume has successfully been defined, it may be available to configure for use, which is discussed in the next section.

Configuring a Hypervolume for Use

In one embodiment, as part of a hypervolume definition, no assignments for use are made. One exception to this may be when the specified primary physical volume is mapped for use by a server when the definition is made and the server mapping is allowed to use the newly created hypervolume in place of the physical volume that is specified for use as the primary physical volume. In this case, the hypervolume may be automatically configured for use by the server. Hypervolumes may be mapped for use by servers in a similar manner that a normal volume is mapped to a server. A method may be created to allow a user to select a hypervolume from a list of hypervolumes defined in the system instead of a regular volume. The user could select the LUN number to map the hypervolume to as well as the port to map it to. The system on which the hypervolume is being mapped to a server may need to know where the hypervolume is registered (HVMF system) to get the hypervolume component definitions and current operational state information from. This system may also need to get authorization for access to the hypervolume by the selected server on the selected storage system. This can be attained from the HVMF system managing the hypervolume data. If access to the hypervolume is attained, the server mapping may be performed and access to the hypervolume may be registered on the HVMF system. Registering access to a hypervolume may provide the ability for the HVMF to log the event in the audit log for the hypervolume as well as to prevent accidental deletion of the hypervolume until all users have been terminated.

Once this has completed, the system on which the hypervolume has been mapped may establish an association to the hypervolume with the primary hypervolume access point system. The current primary access point system definition may be acquired from the HVMF. The new hypervolume access point system may notify the primary hypervolume access point system of the new mapping and establish a session to use to forward server I/O requests. This may require the primary hypervolume access point system to map the hypervolume for use by the new hypervolume access point system over one or more server ports on this system. Once this is successfully completed, the hypervolume may be ready for use on the new system for the specified server.

Systems that configure a hypervolume for use may save information about the hypervolume in non-volatile storage and restore this information when they reboot. The minimum amount of information necessary for the system to reestablish access to the hypervolume may be maintained. This can include the hypervolume system-wide name as well as the primary/secondary HVMF where the hypervolume is registered. Because the hypervolume can continue to be used while the system has been out of service, most everything else about the device may be attained from the HVMF during initialization to insure that the system gets the current state of the hypervolume components.

A user may unmap a hypervolume from a server when it no longer needs to access the device. When this occurs, the system on which the event takes place may notify the HVMF for the hypervolume of the change so that the HVMF can remove the hypervolume registration for the device. The system may also notify the primary hypervolume access point system of the event so that it may remove the mappings from use by the notifying system.

The HVMF may check hypervolume registered users periodically to make sure that the system is still using the hypervolume. In the event the HVMF determines the system no longer needs access to the hypervolume, the HVMF may terminate the registration of the system for the device. The primary hypervolume access point system may also poll hypervolume users to check if they are still using the device. In the event they determine the system no longer is using the device, the logic may terminate the mappings for the system to the hypervolume.

Hypervolume Control Operations

Once a hypervolume has been defined and configured for use, changes may be made to control its continued operation. Hypervolume control operations may be initiated through the primary HVMF for the hypervolume being controlled. For some control operations, interaction between the HVMF and associated systems may take place in order to complete the requested operation. One or more of the following hypervolume control operations may be supported:

Hypervolume deletion
Add physical volume
Remove physical volume
Change primary hypervolume access point
Change primary physical volume
Remove hypervolume user
Authorize hypervolume user
Change hypervolume access policy
Add hypervolume management facility system
Remove hypervolume management facility system
Change current hypervolume management facility leader
Clear hypervolume reservation
Perform task management operations on hypervolume
Enable/disable write-cache at hypervolume level
Enable/disable read-cache at hypervolume level
Snapshot control operations
Define new hypervolume mirror/replication strategy (HVMRS)
Change HVMRS parameters
Change hypervolume policy parameters
Perform fractured hypervolume operations to rectify
Perform server mappings to hypervolumes Hypervolume deletion may be used when the use of the hypervolume is no longer required. The HVMF may deny the request if there are any servers still mapped for use of the specified hypervolume. If the request is to be performed, the HVMF may notify all systems having components associated with the hypervolume (e.g., systems where physical volumes for the hypervolume are defined) that the hypervolume is being deleted. This may allow these systems to free up those components for other use. Any secondary HVMF systems can be notified of the event. In the event a system cannot be notified of the deletion event, a mechanism can be developed to insure that the resources will be cleared up when the system becomes active again.

A user may use the add physical volume control operation to add another physical volume to the hypervolume definition. The user may specify the storage system id and volume id on that system that is to be added to the hypervolume. The specified volume may be configured for the same size as the hypervolume. If there are limitations to the number of physical volumes that can be configured for a hypervolume, the HVMF may check this and may reject the request if this value is to be exceeded. The HVMF may notify the new physical volume system of the change, which may cause that system to attempt to reserve the volume for use by the hypervolume. The request may fail if the specified volume is currently mapped for use by a server. There may be other reasons why the specified volume may not be available for use for the hypervolume. If the change is successful, the added volume may be reserved for use by the hypervolume as a new secondary physical volume. The HVMF may add the new component to the hypervolume definition, and then notify the other component systems of the addition. The primary physical volume system may begin replicating the primary physical volume to the new member.

The remove physical volume control operation may be used to remove the specified physical volume from the hypervolume definition. If the specified physical volume is currently the primary physical volume defined for the hypervolume, the request may be rejected. If the HVMF determines that the request will be honored, it may notify the primary physical volume system of the change so that it can halt replication to the specified physical volume. It then may notify the system on which the physical volume is hosted to remove the reservation of the component for use by the hypervolume and make it available for other use. It may then remove the specified physical volume from the hypervolume definition.

The change primary hypervolume access point control operation may be used to move the primary access point in the system for the hypervolume. The user may specify the system id of the storage system on which the primary access point is to be moved. The HVMF may validate the specified system id and state of the hypervolume and, if invalid, may reject the request. If the request is to be honored, the HVMF may send a request to the system where the primary access point for the hypervolume is currently defined requesting that the primary access point be moved to the user specified location. This may begin a process on the primary access point system to move the primary access point for the hypervolume to the specified system. As part of this process, the systems involved in the move may notify the HVMF if/when the action has completed along with the status of the process. If successful, the HVMF may register the new primary hypervolume access point location in the hypervolume definition. This control operation may be initiated through/by the HVMF and may be performed by system components. The result of the requested action may be determined sometime after the initial request. In the event the current primary hypervolume access point system is not operational or cannot be contacted to process this request, the user may desire the ability of forcing this change without going through the normal process. In this case, the user can force the change to take place. Forcing this change may only deviate from the normal request processing if the current primary hypervolume access point system cannot be contacted to process the request. When this occurs, if the user specified a forced change, the HVMF may notify the specified new primary access point system of the change, and if that succeeds, the change may be put into effect by registering the new primary hypervolume access point in the hypervolume definition and then notifying all of the other systems having a secondary access point of the change. This action may cause the hypervolume to become fractured, which will be discussed later. This action may also require the user to perform other control operations on the hypervolume in order to allow continued operation by the hypervolume to occur.

The change primary physical volume control operation may be used to move the primary physical volume for the hypervolume to another physical volume defined for the device. The specified physical volume may be associated with the hypervolume. If the HVMF does not find cause to reject the request, it may send a request to the system where the current primary physical volume is defined to start the process of moving the primary physical volume location. A number of things may need to be in place before the primary physical volume location can be changed. One of these items may be that the requested physical volume be completely mirrored to the current primary physical volume. As part of this process, when the action finally takes place, the systems which are associated with the action may notify the HVMF when the move has been completed or if an error is incurred that precludes the requested change. In the event the current primary physical volume system is not operational or cannot be contacted to process the request, the user may need the ability of forcing this change without going through the normal process. In this case, the user can force the change to take place. Forcing this change may only deviate from the normal request processing if the current primary physical volume system cannot be contacted to process the request. When this occurs, if the user specified a forced change, the HVMF may notify the specified new primary physical volume system of the change, and if that succeeds, the change may be put into effect by registering the new primary physical volume in the hypervolume definition and then notifying the current primary hypervolume access point system of the change. This action may cause the hypervolume to become fractured, which will be discussed later. This action may also require the user to perform other control operations on the hypervolume in order to allow continued operation by the hypervolume to occur.

The remove hypervolume user control operation may be used to force the removal of the specified server from access to the hypervolume. This action may terminate access to the hypervolume by the specified server regardless of the effect of the action, so the user should be certain before issuing this request. The HVMF may notify the storage system on which the specified server has access to remove the mapping of the hypervolume from the server. If this succeeds, the HVMF can remove the server from access of the hypervolume and the requested operation may be completed successfully. In the event the system on which the mapping of the hypervolume to the server occurs is not operational or cannot be contacted to process the request, the primary hypervolume access point system may be contacted to end the access of the hypervolume to the storage where the specified server has access. If this succeeds, the operation may be completed and the server access to the device may be removed from the registration. When this occurs, the primary hypervolume access point may reject any requests by the other system to reestablish access to the hypervolume. Also, systems that provide access to hypervolumes may poll the HVMF for the hypervolume for period status on its access privileges. If the HVMF determines that a polling system has lost its access privileges to a hypervolume, it may notify that system of the event which should cause the system to remove the mapping of the hypervolume from the affected server.

The authorize hypervolume user control operation may be used to add the specified server/storage system to the list of servers that are allowed access to the specified hypervolume. This control operation may become the method by which a hypervolume is mapped for use by a server (instead of adding to the current mapping methods). If this is the case, the HVMF may notify the specified storage system to map the hypervolume to the specified server using the specified LUN number. If this is successful, the new server may be added to the registered users of the hypervolume. As part of the processing of this request, the storage system on which the hypervolume/server mapping takes place may need to establish connectivity to the primary hypervolume access point system in order to forward server I/O requests to. If this fails, the mapping may become ineffective.

The change hypervolume access policy control operation may be used to make changes to the access policy defined for the specified hypervolume.

The add hypervolume management facility system control operation may be used to add another system to the hypervolume definition that is to provide HVMF services for the specified hypervolume. The specified HVMF system may be a secondary HVMF system, but consideration can be given to the case where the primary HVMF system fails and a secondary HVMF system was not defined. If a new secondary HVMF system is being added, the primary HVMF may establish connectivity to the specified system and if successful may register the hypervolume configuration data onto the new system. In some cases, adding a new HVMF system will affect more then one hypervolume (e.g., potentially all of the hypervolumes defined on the HVMF). To support this need, the user may have the ability of adding a new HVMF to a group of hypervolumes. If the new HVMF is successfully added to the configuration, all affected hypervolume users may be notified of this event.

The remove hypervolume management facility system control operation may be used to terminate the specified HVMF system from being a HVMF service provider for the specified hypervolume. If the specified HVMF system is currently the primary HVMF system, the request may be denied. The specified HVMF system may be notified of the request by the primary HVMF system, and if successful, the specified system may terminate it's HVMF duties for the specified hypervolume. Other hypervolume component systems can then be notified of the event. In some cases, the removal of a HVMF system from use will affect more then one hypervolume (e.g., potentially all of the hypervolumes defined on the HVMF?). To support this need, the user may have the ability of removing a HVMF system from a group of hypervolumes. All hypervolume users may be notified of this event.

The change current hypervolume management facility leader control operation may be used to change the primary HVMF system managing one or more hypervolumes. The user may specify the new HVMF system leader as well as the hypervolumes being affected. The specified HVMF system may be defined as a secondary HVMF for the specified hypervolumes, and if not, the request may be denied. The specified HVMF system may be up to date with the affected hypervolume definitions, and if not, either get up to date or the request may be denied. If the request is to be honored, all affected systems may be contacted with the change before the request can complete successfully. It is possible that not all affected components can be contacted to put the change into affect.

The clear hypervolume reservation control operation may be used to clear a server device reservation from the specified hypervolume. This could be used to clear the device reservation for a server that has become inoperative and no reservation clearing event has occurred or to use in the testing of hypervolume logic. Because device reservations for a hypervolume may affect servers attached to potentially multiple storage systems, this event may be processed by several systems. The HVMF system processing the user request may send the request to the currently defined primary hypervolume access point system, which is the central point where hypervolume device reservations are managed. If the specified hypervolume is no longer reserved, the system sends a successful response back to the HVMF. If the hypervolume is reserved, the system may clear the device reservation and then send a device reservation clearing event message to the system that has the specified hypervolume reserved (if other then the system processing the request). Receipt of this message by the system that had the hypervolume reserved may cause that system to clear the device reservation and report this event appropriately to the server that had the device reserved. The processing of this event by the primary hypervolume access point system may be similar to the processing of any event that causes the device reservation to be cleared. This request may be processed by the currently defined HVMF system for the specified hypervolume.

The perform task management operations on hypervolume control operation can be used to perform/test task management event processing for a hypervolume. This could be useful in testing task management event processing for hypervolumes. With this function, users could generate task management events for a hypervolume and initiate the processing of those events throughout the system.

The enable/disable write-cache at hypervolume level control operation may be used to control the use of write-cache at the hypervolume level. The actual use of write-cache may depend on a number of considerations. This control operation may define the desired write-cache use for the hypervolume. When received by the primary HVMF, the request may be forwarded to the current primary hypervolume access point system to process. The HVMF system may also register the specified write-cache setting in the hypervolume definition database.

The enable/disable read-cache at hypervolume level control operation may be used to control the desired use of read-cache at the hypervolume level. The actual use of read-cache depends on a number of considerations. When received by the primary HVMF, the request may be forwarded to the current primary hypervolume access point system to process. The HVMF system may also register the specified read-cache setting in the hypervolume definition database.

Snapshot control operations may provide snapshot images of the hypervolume. Snapshot management for hypervolumes may deal with the changing point (system) where snapshots are to be performed. Hypervolume snapshots may be initiated on the system where the primary hypervolume access point is currently defined. Write-cache may be drained prior to taking a snapshot for the hypervolume. However, the snapshot structures may actually be created on the systems hosting physical volumes associated with the hypervolume. So, at the point in time that the primary hypervolume access point system initiates a snapshot, it may make a request to the current primary physical volume system to take a snapshot of the primary physical volume. Once this is done, the primary physical volume system may notify other systems hosting secondary physical volumes associated with the hypervolume to create the same snapshot.

The define new hypervolume mirror/replication strategy (HVMRS) control operation may be used to change the HVMRS being used for the specified hypervolume. This may change the replication strategy from sync to async or from async to sync. The user may use the change HVMRS parameters control operation to change any parameters associated with the currently defined HVMRS. These two control directives may work together to allow the user to control the mirror/replication of data from the primary physical volume to secondary physical volumes.

The hypervolume policy parameters control operation may be used to modify any policy attributes for the hypervolume.

Certain events can result in the hypervolume becoming fractured. The perform fractured hypervolume operations to rectify control directive may be used to determine how the system is to recover from a fractured hypervolume.

As discussed in the "authorize hypervolume user" directive section, the method for mapping hypervolumes to servers may be defined to utilize the perform server mappings to hypervolumes control directive. Should this be the case, these two directives could be combined into one directive for mapping hypervolumes to servers. If they are not combined, this control operation could be used to map a hypervolume to a server through the HVMF.

An added value item that can be considered is the ability for a user to define control directive sequences that would be used to perform configuration changes for different hypervolume uses. Ideally, the hypervolume logic can automatically make configuration changes to adapt to different hypervolume uses. But in the event this is not possible/practical, providing a method a user could use to "program" the control directives for making the necessary changes to configure the hypervolume for different uses could be implemented. This may allow these "scripts" to be developed and tested ahead of time so that when they are needed they have already been done. An example of this may be to create a "script" to run when a hypervolume is to be modified to support a disaster recovery configuration. Another one could be created to modify the hypervolume when going back to a production configuration from a disaster recovery configuration.

Monitoring a Hypervolume

Because of the distributed nature of hypervolume components, monitoring the operation of a hypervolume may become challenging. One of the services of the HVMF system may be to provide a centralized point to monitor and collect information about the operation of hypervolumes.

Information about physical volume components can be attained. One or more of the following information may be made available by the HVMF for hypervolumes:

Show Hypervolume List
Show Hypervolume Definition Information
Show Hypervolume Statistics
Show Hypervolume Component States
Show Registered Hypervolume Users
Show Hypervolume Audit Information
Show Hypervolume Reservation Information The show hypervolume list directive may generate a list of hypervolumes being managed by the HVMF. In one embodiment, there may be a need to list hypervolumes where the HVMF is currently defined as the primary HVMF separately from those where the HVMF is a secondary HVMF. This list can be used to zero in on a particular hypervolume or to use to map a server to use a hypervolume.

The show hypervolume definition information directive may display the definition information for the specified hypervolume. This may be done regardless of whether the HVMF is/is not the current primary HVMF. This directive can be used to compare the hypervolume definition information saved on different HVMF systems to check if they contain the same information. There may be additional information provided for a hypervolume by the primary HVMF that is only relevant on the primary HVMF system. The information displayed may include all hypervolume components, the current HVMRS along with all parameters, any policy definitions and the current primary component information. HVMF definitions may also be included.

The show hypervolume statistics directive can show hypervolume level statistics. This information could include total bytes read/written, total read/write I/Os, bytes read/written by server, read/write I/Os by server. If these values need to be collected from different systems servicing the hypervolume, the HVMF could acquire these values before reporting them to the user. This directive can be serviced by any HVMF defined for the hypervolume.

The show hypervolume component states directive can show the state of the hypervolume components in the system. This could include the primary component states as well as the replication states if pertinent. This directive can be serviced by any HVMF defined for the hypervolume.

The show registered hypervolume users directive can be used to show what servers on what storage systems have been registered to use the hypervolume. It might be useful to also show the amount of activity each user has performed on the hypervolume.

The show hypervolume audit information directive can be used to show an event history associated with a hypervolume. Audit information can be maintained by HVMF systems to record all pertinent events associated with a hypervolume in case something goes wrong with it. Types of events that may be logged could include when the hypervolume was created, when changes to the hypervolume configuration were made and by whom, when servers have been mapped to use the hypervolume, etc. Audit logging will be discussed in a subsequent section.

The show hypervolume reservation information directive can be used to show the current state of a hypervolume device reservation. If the device is currently reserved, the server and associated storage system through which the device reservation has been issued may be displayed.

Hypervolume Audit Logs

Because of the distributed nature of hypervolume components, a method may be provided to collect log messages of events associated with hypervolumes that can be collected from all systems associated with the hypervolume. Events emanating from the HVMF can be logged without much effort. Events occurring on systems hosting components of the hypervolume may have the ability to send event messages to the HVMF system to be logged for the device. This can be in addition to logging these events in the local logging facility.

The primary HVMF system can be the primary point of contact for reporting events associated with a hypervolume. The primary HVMF may be responsible for forwarding events to any secondary HVMF systems as they occur. In the event these forwarded messages cannot be delivered, this event may be logged in the primary HVMF event log. In the event the audit log becomes out of sync between HVMF systems, a mechanism may be defined to identify this and to synchronize the audit log across multiple HVMF systems.

Because the audit log could be maintained on two separate systems, it may be desirable that messages generated on both systems be sorted by time across the systems to better serve the needs of people using the messages to determine what happened. This shouldn't be a problem when things are operating normally, but could be an issue when a HVMF system is unavailable for some period of time and then becomes available again.

While audit log messages can be kept in a single file, it may be desirable to report messages pertaining to a single hypervolume instance when working on an issue. In order to support this, it may be desirable to place a unique identifier based on the hypervolume id in each message that could be used to identify the messages pertaining to the hypervolume. It might also be desirable to report all messages based on a component or system id.

Regardless on how the audit log is maintained, some method to manage the message files may be defined. Over time, a large number of messages may be produced and may be maintained in order to track the operations of a hypervolume.

Physical Volume Discussion

Physical volumes associated with hypervolumes may provide the physical storage object used by hypervolume objects. Storage tiers and Data Progression rules may apply.

One physical volume may always be configured for use by a hypervolume. Additional physical volumes may also be associated with the same hypervolume as described below. In one embodiment, a physical volume can only be associated with one hypervolume at a time. When associated with a hypervolume, physical volumes may function in one of two roles at any point in time, either as primary physical volumes or secondary physical volumes. However, their role can change during the course of operation, either automatically or through user control directives. In a further embodiment, there can only be one primary physical volume defined at a time for a hypervolume and one or more secondary volumes defined.

In one embodiment, physical volumes may not be mapped directly to servers but do process server I/Os directed to the associated hypervolume. The primary physical volume may contain the storage that is used to service server read/write commands. While a physical volume is associated with a hypervolume, the volume may be prevented from being mapped directly to a server. A physical volume associated with a hypervolume may also be prevented from being copied in ways other then those used for hypervolume purposes.

The system on which the primary physical volume is hosted may be responsible for mirroring/replicating the physical volume data from the primary physical volume to any defined secondary physical volumes. The system may use the hypervolume mirroring/replication strategy (HVMRS) defined by the user for the hypervolume to determine how to replicate the data. This may specify whether synchronous or asynchronous replication is to be used as well as any operational parameters to use in this effort.

When a physical volume is first associated with a hypervolume, it may already be mapped for use by a server. As part of associating a physical volume with a hypervolume, any existing server mappings to the physical volume may be rectified or terminated. If the situation exists where a physical volume is currently mapped to a server and is currently active and a user wants to convert the physical volume over for use with a hypervolume, it may be desirable to allow the hypervolume to be defined using the physical volume as the primary physical volume and replace the mapping of the physical volume to the server with a comparable mapping to the newly created hypervolume. If done right, this could allow the conversion from a physical volume to a hypervolume to be done on the fly without requiring the server to be halted. Note that access restrictions placed on the hypervolume may preclude the mapping of a newly created hypervolume to a server that is currently mapped to the primary physical volume being defined for the hypervolume. If this is the case, the creation of the hypervolume may fail due to the primary physical volume being in use by one or more servers.

If a physical volume is being defined/added to a hypervolume definition as a secondary physical volume, it may not be practical to remap servers to the associated hypervolume due to the fact that the physical volume is being defined for use as a copy of data from the primary physical volume, which will may cause the data on the physical volume to be changed from what it was when the server was using it. So, when a physical volume is being defined for use by a hypervolume as a secondary physical volume, any server mappings to the physical volume may be cause for failure of the addition until a user unmaps the physical volume from all servers and then retries the operation to add the physical volume to the hypervolume definition as a new secondary physical volume.

Physical volumes associated with hypervolumes may get I/O directed at them from different sources for different purposes depending on the role in which they currently function (e.g., either primary or secondary). Primary physical volumes may get I/O directed at them from hypervolume processing of server requests directed to the hypervolume level. These requests may be generated from the primary hypervolume access point system defined for the hypervolume. In one embodiment, it may be desirable to insure that I/O requests directed to the currently defined primary physical volume only come from the currently defined primary hypervolume access point system. Otherwise, data integrity issues may occur.

Secondary physical volumes may get I/O directed at them from the primary physical volume component replicating data written to the primary physical volume to the secondary physical volume. In this role, no READ commands may be issued to a secondary physical volume. In one embodiment, it may be desirable to insure that I/O requests directed to a secondary physical volume only come from the currently defined primary physical volume for the hypervolume. Otherwise, data integrity issues may occur.

Cache use at the physical volume level may function differently depending on the current role of the physical volume. This may allow different cache settings to occur for each physical volume defined for the hypervolume. However, their use may be influenced by the role in which they serve for the hypervolume.

Primary physical volumes can use write-cache to help improve performance of the physical and hypervolume requests. I/O directed to the primary physical volume may come from the primary hypervolume access point system. In many configurations, these two components may exist on the same system. When this occurs, it may not be prudent to enable write-cache at both the hypervolume level and the physical volume level. When this is the case, the logic may determine this and may configure write-cache appropriately to optimize performance while utilizing write-cache memory efficiently. Similarly, when the primary hypervolume access point system is different then the primary physical volume system, the use of write-cache at both levels concurrently may have a limited effect on performance. Therefore, when write-cache is enabled at the hypervolume level and primary physical volume level, the logic may enable write-cache at the hypervolume level and disable write-cache at the primary physical volume level. Read-cache, if enabled, may function at the same level as where write-cache is currently enabled.

Secondary physical volumes can use write-cache to help improve the mirroring/replication of data from the primary physical volume to the secondary physical volume. Secondary physical volumes may configure write-cache settings as defined for the physical volume. It may be determined that it is undesirable to use write-cache for replicated data associated with a hypervolume. Should this be the case, the previous statement may be ignored. Consideration may be given to provide a configuration setting at the hypervolume definition level to define how to configure write-cache use for secondary physical volume components. Read-cache settings for secondary physical volumes may not be a consideration, since no READ commands may be directed to a secondary physical volume.

Data Progression processing, such as disclosed in U.S. patent application Ser. No. 10/918,329, filed Aug. 13, 2004 and titled "Virtual Disk Drive System and Method" and U.S. patent application Ser. No. 11/753,357, filed May 24, 2007 and titled "Data Progression Disk Locality Optimization System and Method," each of which was previously incorporated by reference herein, may be applied generally normally for a primary physical volume. Primary physical volumes may provide the storage used to service I/Os from servers. The storage access processing may reflect the actual server use of the storage, allowing normal Data Progression processing to work. However, Data Progression processing on a secondary physical volume may be altered due to the fact that secondary physical volume I/O may only reflect the data written to the hypervolume without reflecting the read accesses. If left unchanged, Data Progression decisions to migrate storage pages to a lower tier of storage on a secondary physical volume may cause heavily used pages (e.g., due to heavy READ access) on the hypervolume to be moved to lower tiered storage. This may be acceptable (or desirable) because the secondary physical volume might only be used for disaster recovery scenarios and performance considerations during normal operation might be of secondary importance. However, there may be instances where this is not desirable with the preference being that Data Progression processing for secondary physical volumes would mirror the primary physical volume. This might be a hypervolume preference setting defined by the user for the hypervolume.

Snapshots, such as disclosed in U.S. patent application Ser. No. 10/918,329, filed Aug. 13, 2004 and titled "Virtual Disk Drive System and Method" previously hereby incorporated by reference herein, in one embodiment, may not be scheduled directly by a user for a physical volume that is associated with a hypervolume. This does not mean that snapshots will not be taken for physical volumes; just that a user may not schedule them for a physical volume. Snapshots can be taken of physical volumes for use by the hypervolume logic to replicate the data from the primary physical volume to a secondary physical volume. Snapshots can also be scheduled by users for the hypervolume associated with a physical volume. These hypervolume snapshots may be maintained/managed at the physical volume level. If a physical volume has user scheduled snapshots defined for it when it is associated with a hypervolume, the snapshots may be terminated before the physical volume can be associated with the hypervolume or the snapshot schedule may be automatically adopted by the associated hypervolume.

Hypervolume Associations

A method to implement and manage associations between hypervolume components may be developed and implemented to facilitate the operation of the hypervolume object. A need for associations may become more significant when component definitions change in the system. Associations may help coordinate changes in roles of hypervolume components to insure that these changes are established system wide before the hypervolume object can function properly.

The first association discussed is the association between secondary hypervolume access point components and the currently defined primary hypervolume access point component. This will be herein referred to as the secondary hypervolume access point->primary hypervolume access point association (SHVAP->PHVAP association). Secondary hypervolume access point systems may establish an association with the primary hypervolume access point system in order to forward server I/O requests to be processed for the hypervolume. This association may occur at several levels. One level might be to establish zone mappings for use to direct I/O requests to the hypervolume for the secondary hypervolume access point system. Another level might be to establish a peer session between the secondary hypervolume access point system and the primary hypervolume access point system to be used for I/O requests going to the hypervolume. When the primary hypervolume access point system definition changes, all secondary hypervolume access point associations may be terminated by the outgoing primary hypervolume access point system. New secondary hypervolume access point associations may be established by each secondary hypervolume access point system before I/Os can be process for the hypervolume. In the event a hypervolume I/O request is received by a system that is currently not the primary hypervolume access point system, an error may be returned indicating this, which may cause the system receiving the error to communicate with the HVMF system for the hypervolume to identify the current primary hypervolume access point system and then establish a session with the current primary hypervolume access point system before reissuing the I/O to the hypervolume. In systems where more than one server is mapped to the same hypervolume, it may be desirable to establish a session for each server mapped to the hypervolume in order to manage the hypervolume access properly. If a controller fails that hosts a primary hypervolume access point component, all SHVAP->PHVAP associations may be reestablished with the surviving controller. Redundant controllers that take over the function of a primary hypervolume access point component for a hypervolume due to a controller failure may not need to be aware of SHVAP->PHVAP associations on the other controller. However, it may need to be aware that the other controller is the defined primary hypervolume access point for a hypervolume so that if that controller fails, the surviving controller knows to take over these responsibilities. Note that if the system hosting a primary hypervolume access point fails and a redundant controller assumes this function, this event can be registered in the HVMF, and the other hypervolume components may be notified of the event. This may cause secondary hypervolume access point systems to establish new SHVAP->PHVAP associations to continue use of the hypervolume.

The second association discussed is the association between the primary hypervolume access point component and the primary physical volume component. This will be herein referred to as the primary hypervolume access point->primary physical volume association (PHVAP->PPV association). This association may be used to manage I/O directed from the hypervolume level processing to the primary physical volume level. In one embodiment, only one association may be supported by the primary physical volume level and this may be with the current primary hypervolume access point component. As part of becoming the primary hypervolume access point component, this association with the primary physical volume component may be established. If the primary physical volume component gets a request to establish the PHVAP->PPV association and it already has one of these associations established, both components may reference the HVMF to determine the proper association to establish. This might occur, for example, when the primary hypervolume access point is changed from one system to another. As part of changing the primary hypervolume access point definition, the outgoing primary hypervolume access point system may terminate its association with the primary physical volume during the processing of the change. The new incoming primary hypervolume access point system may establish the PHVAP->PPV association before processing hypervolume I/Os. The primary hypervolume access point may establish the PHVAP->PPV association. Redundant controllers that take over the function of a primary hypervolume access point for a hypervolume due to a controller failure may establish the PHVAP->PPV association when these services are assumed. The redundant controller assuming the primary physical volume component function may have the PHVAP->PPV established before accepting I/O requests to process for the physical volume. The primary physical volume component can maintain knowledge of the primary hypervolume access point definition from the HVMF to validate association requests when they are received.

The third association discussed is the primary physical volume to secondary physical volume association. The will be herein referred to as the PPV->SPV association. This association may be used to replicate data from the primary physical volume to the secondary physical volume. In one embodiment, each secondary physical volume may have only one PPV->SPV association established at a time. The primary physical volume may have a PPV->SPV association established for each secondary physical volume defined for the hypervolume. When the primary physical volume is being moved for a hypervolume, the outgoing primary physical volume may terminate all of its PPV->SPV associations as part of the change processing, and the new incoming primary physical volume component may establish PPV->SPV associations with all secondary physical volumes defined for the hypervolume. Once the new PPV->SPV associations are established, the mirroring/replication can continue as specified by the HVMRS for the hypervolume. The primary physical volume component may establish PPV->SPV associations. Secondary physical volume components may assist the primary physical volume component to establish this association by sending a message to the primary physical volume component when it detects that this association has not been established. This may be useful when a system initializes that hosts a secondary physical volume component of a hypervolume. It can also be useful in other instances. If a primary physical volume component receives a request to establish a PPV->SPV association, both components may reference the HVMF to determine the proper association to establish. Redundant controllers assuming the primary physical volume functions due to a failed controller may establish all PPV->SPV associations before continuing with the mirroring/replication functions of the hypervolume. Note that when the PPV function fails over to a redundant controller, this event may be registered with the HVMF, and the other hypervolume components may be notified of the event. Systems hosting SPV components may terminate any associations with the failed PPV controller so that new associations can be established with the redundant controller assuming the PPV functions.

Fractured Hypervolume Discussion

The distributed nature of hypervolume components may lend itself to events that cause the normal operation of the hypervolume and its components to become isolated. If this was to occur and the state of the hypervolume components remained unchanged, the hypervolume integrity could be maintained until the events that caused the components to become isolated were rectified. However, during this period, the hypervolume data might not be available for use by any servers, which could be unacceptable to the user. An example of this would be a system hosting the primary hypervolume access point completely fails and cannot be repaired for several days. Secondary hypervolume access point systems may not be able to forward I/Os for the hypervolume because of the failure. For example, say the primary physical volume for the hypervolume was hosted on another system that is still operating normally. A new primary hypervolume access point could be forced into service in order to provide this component to allow use of the hypervolume by servers in the system. However, there may be data stored in write-cache on the failed system that did not get written out to the primary physical volume. Although this data may be lost because of the failure, it might be more important to reconfigure the hypervolume with the remaining components and continue operations rather then to wait until the failure can be rectified. Because of this, when this change is made to the hypervolume, the hypervolume may be marked as being fractured.

A fractured hypervolume, as used herein, may include a hypervolume that cannot continue to function normally as a hypervolume because of one reason or another but, nevertheless, needs to continue to function as best as possible. One reason for marking a hypervolume as fractured may be to cause concern of hypervolume components when they become operational again after the fracturing event. When hypervolume components become operational, they attempt to regain participation in the hypervolume operation. However, due to the intervening events of the hypervolume, normal participation in the hypervolume operation may not be appropriate for a component. If a hypervolume component becomes operational and determines the hypervolume is fractured, it may perform some added checking before resuming participation in the hypervolume operation. User intervention may be necessary before a component can participate in a fractured hypervolume operation. In severe cases, it may be necessary to remove a component from a hypervolume definition and then add it back in to recover from the isolating event.

When an event occurs that causes a hypervolume to become fractured, the event (or events) may be logged in the hypervolume audit log along with the indication that the hypervolume is being marked as fractured. Next, the systems on which hypervolume components are hosted may take inventory of which components seem to still be functioning. This information may be used to determine the proper corrective action to attempt to continue operation of the hypervolume. Whether corrective action is to be taken may be defined by the user when the hypervolume is defined. Regardless, at the point in time when corrective action is taken to recover from a fractured hypervolume, the components that are not functioning normally may be marked as damaged and may not be allowed to participate in the operation of the hypervolume without special processing depending on the failed component and the state of the fractured hypervolume. The remaining components of the hypervolume may be reconfigured to allow the fractured hypervolume to continue to be used as best as possible. Changes to the fractured hypervolume may take place among the working components of the hypervolume. When damaged components of the hypervolume become operational, the user can attempt to bring them back into operation with the working hypervolume.

In systems using many hypervolumes, a system failure may result in a number of hypervolumes becoming fractured. The same hypervolume component may be damaged for each of the fractured hypervolumes. The HVMF system may include logic to detect when this occurs and allow the same corrective action to be performed on all of the affected hypervolumes in an attempt to bring them back into operation. Once the failed system becomes operational again, the HVMF may have logic to detect when this occurs and to perform the same corrective action to bring the damaged hypervolume components back into operation with the working hypervolumes.

Hypervolume Management Facility (HVMF) Discussion

Because hypervolumes can consist of components hosted in a number of distributed systems, a centralized point of control may be provided to help manage these components and keep them in sync with each other. The Hypervolume Management Facility (HVMF) component may provide these centralized services to manage hypervolume definitions, control, and monitoring, etc. Some of the HVMF functions have been discussed throughout this document.

The HVMF services can be provided in a number of ways. One way may include HVMF services provided within a storage system controller as a separate entity to be used to manage and control hypervolumes operating on its system or for managing hypervolumes operating on other storage systems. Another way may include adding these services to an Enterprise Manager system. The intent here is not to define where or how these services are to be provided in a system. It is recognized that these services may be provided in any number of suitable manners and locations. This section focuses on the services that may be provided and how these services may be utilized in the system to manage hypervolumes and make them work properly.

One or more of the services that may be provided by the HVMF system are shown below:
  Registration of hypervolume components (i.e., definition of hypervolume)
  Registration of hypervolume users
  Coordinate hypervolume changes that affect multiple distributed components associated with the hypervolume
  Provide a central point of contact where the current hypervolume state is maintained
  Provide audit history logs for hypervolumes
  Provide a central system to identify hypervolumes defined in a system
  Provide a central point of contact to monitor hypervolumes defined in a system
  Provide security services to manage assignment of hypervolumes for access by servers. This may include enforcement of access limits placed on hypervolumes by users
  Provide scripting services to make hypervolume changes in the system for specific purposes such as disaster recovery, production recovery, etc.
  Provide a centralized system for hypervolume components to poll for status and changes
  Phone home hypervolume audit logs and other information The registration of hypervolume components services may provide a centralized system where hypervolume component definitions can be maintained and where systems hosting components for a hypervolume can go to check the current definition of components for a hypervolume. The HVMF may contain the "golden copy" of hypervolume component definition, allowing systems hosting hypervolume components to save the fact that an object is a component of a hypervolume, which hypervolume the component is a member of, and the HVMF system identification to contact when dealing with the hypervolume component. As hypervolume components are added or removed from a hypervolume definition, these changes may be stored off on the HVMF and the affected systems may be notified of the change as necessary.

The registration of hypervolume users service may provide a central facility to store the configuration of servers that have been allowed access to hypervolumes. As discussed below, the HVMF may play a role in managing access of hypervolumes by servers and therefore may play a role in registering server access and controlling access to hypervolumes. Because events could occur while a system has been out of service that could affect the access by a server to hypervolumes, systems may communicate with the HVMF during initialization to determine the current mapping of hypervolumes to servers before making them available.

The coordinate hypervolume changes that affect multiple distributed components associated with the hypervolume service may function at many levels to take input from various sources related to a hypervolume operation and determine how best to distribute that input in order to allow the hypervolume to continue to function. The logic surrounding a hypervolume component may focus on the operation of that component as it pertains to the hypervolume operation and report any problems to a facility that can determine how best to deal with those problems. If, in addition to these functions, each component needs to decide how every possible event should be handled and which other components need to be notified, the logic could quickly become unmanageable. Providing a centralized system to take reports of problems from various components in the system may provide the ability to "see" what is happening in the system, determine which components are being affected by the problem, and then make a better decision of what is best to do to rectify the problem.

The provide a central point of contact where the current hypervolume state is maintained service may be another instance of coordinating information about a hypervolume to facilitate the continued operation of a hypervolume. The state information referred to here may include the primary/secondary state of the components associated with a hypervolume. The HVMF can be contacted by a system hosting a hypervolume component when initializing to determine the state of its components as they pertain to the operation of the hypervolume. Once the components' state is determined, the system can take steps to place the component back into operation for the hypervolume. When state changes are made for a hypervolume within the system, the HVMF may become the central facility to initiate the state change and to coordinate the state change as it is processed throughout the system. When a hypervolume component identifies a difference from what its operation was and it needs to find out whether to adopt the change or not, it can communicate with the HVMF for the hypervolume to determine what the current state of operation is and make the necessary changes accordingly. When all hypervolume components are communicating with the same facility to determine the state of all hypervolume components, the desired outcome may be more likely to occur than other alternatives.

The HVMF may provide audit history logs for hypervolumes that can be reviewed to help determine what happened in the system and what resulted from those events. Having a central facility to report log messages to by hypervolume components may allow an orderly collection of information about the hypervolume. This can occur in addition to logging these events in each component's system logs. The audit log information can be used to check on security issues related to hypervolume operation and use. The audit history logs could be useful to help diagnose errors in the management of hypervolume events and the resulting changes that were made to overcome the events.

The HVMF can provide a central system to identify hypervolumes defined in a system to assist in the selection of hypervolumes when mapping to servers as well as for other use. Because the HVMF can collect and manage the information for hypervolumes, it may be a desirable system to use for this purpose. This HVMF service may play with other services like monitoring and controlling hypervolume operation as well as mapping servers to hypervolumes.

The HVMF can provide a central point of contact to monitor hypervolumes defined in a system. Because it manages the definition and state of the hypervolumes defined, users may access this information through the HVMF system. The HVMF system can be used to gather statistics from hypervolume components to report to users instead of making the user gather this information individually from each system hosting a hypervolume component. This service can work with other services to control the operation of the hypervolume and then monitor the effect of the changes on the operation of the hypervolume.

Systems hosting hypervolume components can be developed to interface with the HVMF system when making changes or decisions affecting the operation of the hypervolume. This may allow the HVMF to provide security services to manage assignment of hypervolumes for access by servers. This includes enforcement of access limits on hypervolume by users. By centralizing this function, tighter control for access to hypervolumes can be attained. Also, due to the distributed nature of hypervolume components, having each component communicate with the HVMF system when access changes are being invoked may reduce the possibility of breaking through the security efforts. Linking security services into the audit history logs may provide the ability of determining whether and when security issues occurred and how they were handled.

An added service that could provide much value to managing hypervolumes in a large system by the HVMF may be to provide scripting services to make hypervolume changes in the system for specific purposes. In one embodiment, hypervolume changes could be completely automated, requiring no interaction with users in order to adapt the components to deal with issues that can occur within the system. However, this may not be completely practical, or even desired by some users, in some embodiments. Yet, certain events can require changes to hypervolume operation in order to adapt their operation to deal with system events for which they are being used. Examples of these events may include when a disaster is occurring or is about to occur and the use of a hypervolume needs to be switched to another system or a hypervolume has been used by a system at a disaster recovery site and needs to be switched back to the standard production site. At times when a disaster has or is about to occur, many changes may take place and anything that can be done ahead of time to plan for these occurrences can help. Another option may be to provide templates for common configurations that customers could use to setup and manage hypervolumes. This may provide value to customers as well as to reduce the number of variations of use for hypervolumes and might reduce the number of problems incurred.

Another service of the HVMF may be to provide a centralized system for hypervolume components to poll for status and changes. Because of the distributed nature of hypervolume components, a centralized system, with which systems hosting hypervolume components can communicate, may facilitate in the early notification of events affecting the hypervolume operation. Another possibility may be for all hypervolume components to poll the HVMF, and if a component fails, the HVMF can detect this event and begin actions to recover from the event.

It may also be useful to provide HVMF services to phone home hypervolume audit logs and other information about the hypervolume operations. This could be useful to monitor customer use of hypervolumes and determine if any problems are detected that indicate logic errors or to identify enhancements to the feature. When customers report hypervolume problems, the phone home information could be useful in diagnosing the problems and offering remedies.

It may be decided to offer more then one option for providing HVMF services to customers. For small customer configurations and use, hosting HVMF service within a storage system controller environment may be the most practical. For larger enterprise class customers deploying large hypervolume installations across several locations, providing HVMF services within an Enterprise Manager system might make more sense.

In one embodiment, Ethernet may be the common choice of communications for HVMF services from hypervolume component systems. In a further embodiment, multiple Ethernet links can be supported for redundancy.

Redundant HVMF systems may be supported that can provide these same services when the primary HVMF system is not available. This provides a reason that secondary HVMF systems may be planned for in the definition of hypervolumes. Each hypervolume could have a primary and one or more secondary HVMF systems to link up with for HVMF services. The HVMF systems may communicate with each other to maintain a common database of hypervolume information so that a secondary HVMF can take over the HVMF services if the primary HVMF fails or otherwise becomes unavailable. If a hypervolume component system has trouble communicating with the defined primary HVMF system, it could attempt to communicate with a secondary HVMF system instead. Primary HVMF systems and secondary HVMF systems may communicate with each other, checking the status of each other. In the event they detect a failure with their peer HVMF system, they could perform some recovery procedure to take over the HVMF services if appropriate. A HVMF system may have the ability for a user to gracefully take a HVMF system out of service, allowing its services to be passed over to a redundant HVMF system prior to taking the HVMF system down.

Hypervolume Mirroring/Replication Strategy (HVMRS) Discussion

When more then one physical volume is configured for a hypervolume, a mirroring/replication method may be specified to define how the data is to be replicated from the primary physical volume to the secondary physical volumes. This method is referred to herein as the hypervolume mirroring/replication strategy (HVMRS). The HVMRS may be independent from any other form of replication that might apply to the hypervolume. A purpose of the HVMRS may include keeping secondary physical volumes associated with a hypervolume mirrored from the primary physical volume and may be desirable whenever a hypervolume has more then one physical volume defined.

One unique feature of the HVMRS is that the direction of replication may change as changes to the hypervolume state occur. In one embodiment, the user may not specify the direction of replication while specifying the HVMRS. The replication direction may be performed from primary physical volume to secondary physical volume. When the primary physical volume for the hypervolume is moved (e.g., changed), the direction of replication may automatically change when the move completes. Also, the status of replication may affect the movement of the primary physical volume in that the secondary physical volume being made the primary physical volume may be completely mirrored before the change can take effect.

In one embodiment, there may be two strategies allowed for the HVMRS, synchronous replication and asynchronous replication. Synchronous HVMRS is meant to maintain a real-time mirror of data from the primary physical volume to the secondary physical volumes. Asynchronous HVMRS may provide point-in-time snapshots of the primary physical volume that get replicated to the secondary physical volumes.

Regardless of the HVMRS chosen for use by the hypervolume during definition time, the HVMRS definition may be changed on the fly for the hypervolume. During the period of change, the hypervolume may need to operate in a hybrid mode of replication to make the environment ready to support the newly defined HVMRS type. Changing from one HVMRS type to another may take some period of time to complete. While this is occurring, certain control operations may be denied until this change has been completed. The user also may be able to make changes to HVMRS parameters on the fly. As part of the processing of a primary physical volume change, it may be desirable to take a hypervolume snapshot of the physical volume on all physical volume systems at the point in time when the new primary physical volume is declared.

Synchronous HVMRS Discussion

Synchronous HVMRS may attempt to maintain a real-time mirror of data from the primary physical volume to the secondary physical volume. Data written to the primary physical volume may also be written to the secondary physical volume before the operation is completed back to the requester. Under normal operating conditions, synchronous HVMRS may provide an exact copy of the data on the secondary physical volume as the primary physical volume. However, in order to provide this function, performance may be slower due to the additional delay waiting for the data to be written to the secondary physical volume. Enabling write-cache on the secondary physical volume can minimize this effect. Enabling write-cache at the hypervolume level may also minimize the effect of this latency on write performance when using synchronous HVMRS.

One thing that may be provided for synchronous HVMRS is the ability to keep track of changes made to the primary physical volume when communications with a secondary physical volume have been lost. When communications to the secondary physical volume is reestablished, the primary physical volume can replicate these changes to bring the secondary physical volume back into sync as quickly as possible without requiring the entire physical volume to be copied.

Depending on the technique chosen to track changes made to the primary physical volume when communications is lost with a secondary physical volume system, some parameters may be specified by the user when selecting synchronous HVMRS. One option may be to use periodic snapshots of the primary/secondary physical volumes during the mirroring of data between the two components. These periodic snapshots may provide a checkpoint of the physical volumes that have been completely synchronized. In the event communications is lost between the systems, all data written to the primary physical volume since the last checkpoint snapshot (CPSS) may be replicated to the secondary physical volume. If this method is chosen, then the user may specify the time interval to take checkpoint snapshots. The user may also specify how many CPSS to maintain. Default values may be supplied in the event none are specified. This method could also provide a point-in-time copy of data on the secondary physical volume where hypervolume operation could be continued from in the event the primary physical volume system completely fails.

Another synchronous HVMRS parameter that may be desired is whether de-duplication is to be used when resynchronizing the primary physical volume and secondary physical volume.

When physical volume resynchronization is taking place due to a communications failure between the primary physical volume system and the secondary physical volume system, the resynchronized data may not be in a useable state until the entire physical volume has been replicated. In the event a failure occurs on the primary physical volume and the secondary physical volume needs to be placed into service, the last successful CPSS could be selected as the primary physical volume on the secondary physical volume system in order to provide a cohesive data object. However, once the secondary physical volume has completely resynchronized with the primary physical volume, that copy of data may become available for a new physical volume leader.

When asynchronous HVMRS is selected as the method to mirror data between the primary physical volume and secondary physical volume, there may be times when synchronous HVMRS methods are desired. This may occur, for example, when the primary physical volume is being moved to a secondary physical volume system. To facilitate this operation, the secondary physical volume to which the primary physical volume is being moved may be completely mirrored before the change can be made effective. As such, the process of changing the primary physical volume component of a hypervolume may shift into synchronous HVMRS during the change and then shift back to asynchronous HVMRS once the change has taken place.

Synchronous HVMRS may provide an ordered delivery of replicated blocks of data from primary physical volume to secondary physical volume while the physical volumes are synchronized. Data blocks replicated to the secondary physical volume may be applied to the secondary physical volume in the same order that they were sent by the primary physical volume system. In the event a data block is received out of order, the secondary physical volume may save it away to be applied to the secondary physical volume when prior data blocks have been received and written to the secondary physical volume or discard the block after some period of time has expired and all previous data blocks have not been received and written to the secondary physical volume. By providing this feature, if the primary physical volume system fails, the secondary physical volume copy may be in a useable state, even though all of the data may not have been replicated to the secondary physical volume. This may result in some lost data to the surviving servers. Ordered delivery of replicated data blocks may not be necessary while resynchronizing the primary and secondary physical volumes following a loss in communications between these two systems. This is because during resynchronization, the order of data written to the primary physical volume while communications was lost may be unknown and therefore the order of resynchronization may be unimportant. For this same reason, the replicated data from the last good CPSS of the physical volumes until the volumes have been completely synchronized may be unusable as a primary physical volume.

It may make sense to adopt a form of asynchronous replication methods while communications is lost between a primary physical volume and a secondary physical volume. Taking periodic snapshots during this time could allow the replication of these snapshots to occur when communications was restored. This may have the advantage of providing point in time copies of the primary physical volume at the secondary physical volume component that could be used in the event the primary physical volume component failed before the physical volumes were completely resynchronized.

Asynchronous HVMRS Discussion

Asynchronous HVMRS may attempt to maintain a series of snapshots on the primary and secondary physical volume systems to mirror the data on the two physical volumes. Snapshots taken for hypervolume purposes may be used for hypervolume use and, in one embodiment, may not be available for any other snapshot use. Asynchronous HVMRS may have the advantage of minimizing the effect of delays incurred when replicating write data to a secondary physical volume. Limited bandwidth between physical volume systems as well as large latency due to lengthy distances between physical volume systems may necessitate asynchronous HVMRS to be selected.

When asynchronous HVMRS is selected, the user may specify the time interval to take snapshots of the primary physical volume that are to be replicated to the secondary physical volumes. This interval may become the recovery point objective (RPO) for the hypervolume in case of an unplanned outage of the primary physical volume system during hypervolume operation. The intent may be to migrate to the secondary physical volume prior to any unplanned outage of the primary physical volume system to eliminate the need to force the use of a previous point-in-time snapshot of the secondary physical volume and deal with the resulting lost data when this occurs.

Asynchronous HVMRS may only require the scheduling of snapshots using a time interval between hypervolume snapshots (HVSS). It is also expected that only one time interval for taking hypervolume snapshots may be required. In a further embodiment, the user may specify the number of hypervolume snapshots (HVSS) to maintain for the hypervolume operation. In one embodiment, only one asynchronous HVSS may be desirable, while in other embodiments, more than one asynchronous HVSS may be desirable. This parameter can use a default of one HVSS copy with the ability of the user specifying more, if desired. It may be desirable to allow different asynchronous HVSS intervals to be defined/used for different times of the day. The user also may specify whether to replicate the active point-in-time-copy (PITC) as well as whether to use data de-duplication when replicating data to the secondary physical volumes.

Asynchronous HVSS created by the HVMRS may be managed by the hypervolume logic and may be created and deleted by this logic as needed to maintain the mirror/replication sessions between systems hosting physical volumes associated with the hypervolume. In one embodiment, a new PITC type may be defined for this purpose.

While connectivity is lost between the primary physical volume system and secondary physical volume system, normal HVSS creation may be suspended until communication has been reestablished and the accumulated changes occurring during the outage have been replicated to the secondary physical volume.

When asynchronous HVMRS is used, a temporary modified HVMRS may be adopted when the primary physical volume is being moved to a secondary physical volume. This temporary HVMRS could use synchronous HVMRS while the PPV is being moved. In other embodiments, it might be a hybrid between asynchronous/synchronous HVMRS that allows the secondary physical volume to become completely mirrored from the primary physical volume before the change can become effective.

Hypervolume Access Control Discussion

Because hypervolumes can be accessed from various storage systems, access control to hypervolumes may have additional challenges. Control mechanisms may be added to hypervolumes to manage the assignment of hypervolumes to servers.

Access to storage objects in the storage system may be provided by mapping volumes to servers on one of the system controllers where the storage for the volume is controlled. Access control functions for controlling this operation may be provided in the form of login protection of the user making the change as well as providing folders to control access to certain volumes by certain users on the system where the change is to take effect. Due to the distributed nature of the hypervolume components, a method to control access to hypervolumes throughout the system may be provided.

The hypervolume definition may have the ability of defining access limits to the hypervolume. These access limits could specify that only certain storage systems can map the device to a server, could limit the mapping of the hypervolume to only certain servers, or a combination of both. This may allow access controls to be defined by the user during the hypervolume definition. Then a user may have the ability of adding/changing the access controls of a hypervolume during its operation. This may provide the basis for controlling access to hypervolumes by servers.

In order to enforce the hypervolume access controls, the HVMF component may authorize the assignment of a hypervolume for access by a server. The storage system mapping the hypervolume to a server may get authorization from the HVMF in order to map the hypervolume to the server. Once this occurs, the primary hypervolume access point system may get authorization of the assignment of the hypervolume to the server from the HVMF before allowing a SHVAP->PHVAP association to be established to process I/O requests directed to the hypervolume.

All steps to map a hypervolume to a server may be logged in the HVMF audit log as well as on local logs for the affected hypervolume component systems. Where appropriate, the user id making the configuration change could be included in the log messages. The same may hold true when a hypervolume is unmapped from a hypervolume.

Another level of access controls can be considered for hypervolumes. This level deals with access to the data in ways other than through mapping a hypervolume to a server to access it. This level deals with the copying of hypervolume data to another volume and then accessing the data on the copied volume. If customers want to have controls over this level of access to hypervolumes, then methods may be provided to limit access to hypervolumes and/or hypervolume components so that these devices cannot be copied.

Hypervolume Contingency Group Discussion

Certain environments that cause data to be spread out among several volumes may desire the consistency of data across the volumes to be a necessity. This may exist for any form of volume used to store the data. However, when hypervolumes are used, the challenges in guaranteeing the consistency of data across a group of hypervolumes may increase due to the distributed nature of the hypervolume components. Inconsistency of this data between volumes can cause problems that, in the extreme, yield data that is unusable. In these environments, it may be important to manage the volumes together as if they were one.

Consistency groups may provide a way to associate multiple volumes to use in managing operations related to those volumes. When certain events occur on a member of a consistency group, that same event can be made to occur for all members of the consistency group. An example of this may be the taking of a snapshot of a volume that is a member of a consistency group. Because the snapshot may represent data on that volume at a particular instance in time which could be used for some purpose, any other volumes in the contingency group also may have snapshots taken at the exact same time in order to guarantee that the data represented by the snapshots are consistent with each other.

Because of the distributed nature of hypervolume components not normally found in storage subsystems, there can be some added challenges in managing hypervolumes defined in a contingency group.

Taking snapshots/checkpoints of hypervolumes is an area that may be developed when considering support for hypervolume consistency groups. One of the issues may be specific to both hypervolumes and physical volumes. That issue may include taking snapshots/checkpoints for all volumes in a contingency group at the same point in time. What is unique to taking snapshots/checkpoints when hypervolumes are included in a contingency group is that the systems on which these snapshots/checkpoints are to be made may be different and coordinating these events across the different systems can be challenging. This may involve coordinating snapshots/checkpoints between systems for all of the consistency group members as best as possible to insure a consistent data image across multiple storage objects.

Storage System Management Hypervolume Support Requirements

Hypervolumes provide a new volume type that can be used. As such, the first area of change in management may be the ability to differentiate hypervolumes from physical volumes in the storage display area of the management interface. The second area of change may be to identify physical volumes that are associated with hypervolumes so that users know that they cannot be directly mapped to servers due to their association with a hypervolume. It might also be useful when a physical volume is associated with a hypervolume to indicate the id of the hypervolume as well as the state of the hypervolume component. In one embodiment, different folders for hypervolumes and physical volumes associated with hypervolumes may be one way to handle management support.

From a system hosting a hypervolume component, it may be desirable to access the hypervolume information from the management interface in order to check the status of the hypervolume operation. It might also be desirable to allow a user, through the management interface, to issue control directives that would be forwarded to the HVMF for action.

If a user is allowed to map a hypervolume to a server through management of the storage system, this can be added. This may allow the ability to view a list of hypervolumes defined on a HVMF system and then initiate the mapping request to be processed by the system. This approach may require login information be forwarded to the HVMF by the storage system being controlled in order for the authorization of the request to be made appropriately. The mapping of hypervolumes to servers may be performed through a user interface with the HVMF system. Server mapping displays could be changed to differentiate mappings of physical volumes from hypervolumes.

If consistency groups are to be supported, adding management functionality to support the definition and control of consistency groups may be desirable.

Hypervolume Management Facility (HVMF) Discussion

The hypervolume management facility services may have a separate management interface to monitor and control the operation of hypervolumes in a system. In one embodiment, one or two HVMF systems operating as a primary/secondary set may be defined to manage the hypervolumes associated with a customer's environment. In larger systems, there may be multiple sets of HVMF systems. Each HVMF system may be configured to manage one or more hypervolumes defined in the system. The primary HVMF may provide the primary decision services for the hypervolume. The secondary HVMF may mirror all HVMF data and may take over the HVMF services in the event the primary HVMF becomes unavailable. While a user could normally initiate a management session to the primary HVMF system, it may be desirable that a management session to the secondary HVMF could perform the same monitoring and control functions as are available through the primary HVMF system. In alternative embodiments, the user may utilize the primary HVMF as the focal point for monitoring and controlling hypervolume sessions.

Users may be required to login to the HVMF system to which they initiate a session with. User accounts may be configured on the HVMF systems. It may be desirable that user accounts configured on a primary HVMF system be supported on a comparable secondary HVMF system so the same user can login using the same id/password regardless of the system being accessed. User accounts may be configured with certain control rights assigned to them. In one embodiment, four levels of control rights are identified. The first level may include the administrative level, which can monitor hypervolume definition and status information as well as create new user accounts. The second level may include the control level, which can monitor hypervolume definition and status information as well as issue control directives to manage the operation of hypervolumes. The third level may include the configure to use level, which may allow a user to monitor hypervolume definition and status information as well as provide configure to use access control of servers to hypervolumes. Configure to use controls may include not only the ability to define the access limits placed on a hypervolume but also provide the ability of mapping a hypervolume to a server if this service is provided on the HVMF system. The fourth level may include the audit level, which may allow a user to monitor the audit logs for the hypervolumes as well as control the audit log management. User accounts can be configured to provide more then one level of control.

The HVMF management session may provide a display of all of the hypervolumes defined on the system, regardless of whether the HVMF system is the primary or secondary HVMF system defined for the hypervolume. It might be useful to identify which hypervolumes use the system as the primary HVMF and which ones use it as the secondary HVMF system. From this list, the user may be able to display detailed information about the definition and state of each hypervolume displayed. The user may also be able to display the mapping of each hypervolume to the servers that have registered to use the hypervolume. This display may show the server id as well as the LUN number which the hypervolume is mapped to as well as the storage system id and port id that the server can access the hypervolume on. It may also be desirable to provide physical volume level information to the user for physical volume components associated with a hypervolume.

The HVMF management session may provide the user the ability to issue control directives for a hypervolume. The control directives available for use by a user may be determined by the account levels defined for the user, as described above. Most control directives may be logged in the audit log with the user id of the person issuing the directives. Many hypervolume control directives may issue requests to systems hosting hypervolume components to make changes in the hypervolume operation. This can cause other request messages to be sent to other hypervolume component systems to perform operations. As these messages are sent/received throughout the system, it may be desirable for the user id that initiated the operations for which the request messages are related be included in the request message format so that this information can be included in all log messages associated with the event. As such, all hypervolume messages sent may further include a field to include the user id of the initiating action, if one is available. Also, a field to specify the system id of the initiating action may be included in all messages sent. In some embodiments, a default user id could be used for actions automatically initiated by the hypervolume logic with the system id field specifying the system id of the initiating system. Different default user ids might be used for different components of the hypervolume. Also, user ids for actions that may take a lengthy time to complete may need to be saved while the action is being processed so that it can be included in all messages sent that relate to the same action. Depending on the complexity of the processing of hypervolume control directives, it might also be useful to include an action id in all messages sent to identify the particular action for which the message relates to. This might also prove useful in relating a series of messages being processed for the same action to insure that they all relate to the same action being processed. In the event the action is aborted or terminates, any further messages that might be sent/received having the same action id could be easily identified and ignored.

Enterprise Manager Interface to Hypervolumes

An Enterprise Manager interface to the hypervolume management facility (HVMF) services may be provided, even if these services are not provided by the Enterprise Manager system. This interface may be different than the storage system interface.

Hypervolume Component Summary

Although these components have been discussed in prior sections, an outline of some of the hypervolume components that may be included in one embodiment of a hypervolume is shown below:

Component type
      Hypervolume access point
      Physical volume
      Hypervolume management facility (HVMF)
    Component id
      Access point components
        System id/controller id
      Physical volume components
        System id/controller id
        Volume id
      HVMF components
        System id/controller id
    Primary/secondary component indication
    Normal/damaged component indication Three types of components may be defined for hypervolumes. The hypervolume access point component may define a storage system that is configured to provide access to a hypervolume by a server. Every storage system configured to provide access to a hypervolume may be a hypervolume access point component of the hypervolume. One hypervolume access point component may be designated the primary hypervolume access point of the hypervolume. This system may process all I/O requests directed to the hypervolume. All other hypervolume access point components may be designated as secondary hypervolume access points. Secondary hypervolume access points may forward any I/O requests received from servers to the primary hypervolume access point component for processing. The primary hypervolume access point can be moved to secondary hypervolume access point systems as needed to efficiently process server I/Os directed to the hypervolume.

The physical volume component may define the physical storage used to store the data associated with the hypervolume. In one embodiment, one physical volume may be required for every hypervolume defined in the system. Two or more physical volumes can be defined for a hypervolume to provide additional storage elements to use as needed to maintain the operation of the hypervolume in different situations. One physical volume may be designated as the primary physical volume component of the hypervolume. Any other physical volumes defined for the hypervolume may be designated as secondary physical volumes. Server I/Os directed at the hypervolume may be directed to the currently defined primary physical volume. When more than one physical volume is defined for a hypervolume, a hypervolume mirroring/replication strategy (HVMRS) may be defined to specify how the data is to be replicated from the primary physical volume to the secondary physical volumes. Data written to the primary physical volume may eventually be replicated to all defined secondary physical volumes. The primary physical volume can be moved to another physical volume associated with the hypervolume. In one embodiment, the secondary physical volume that's to become the new primary physical volume may have an exact copy of the primary physical volume data before the move (unless a failure to the primary physical volume occurs). Physical volumes configured for hypervolumes may specify the system id and the volume id on that system.

The hypervolume management facility (HVMF) component may provide the services used to monitor and control the hypervolume operation. It may save the hypervolume component definition and serve as a central control point for hypervolume components to report events associated with the hypervolume operation. In one embodiment, one HVMF system must be defined for a hypervolume. A second HVMF system can be defined to take the HVMF services over in the event the primary HVMF is unavailable. This second HVMF system may become the secondary HVMF system defined for the hypervolume. When more then one HVMF system is defined, the primary HVMF system may be responsible for keeping the secondary HVMF system up to date with the changes taking place for the hypervolume. Other hypervolume components may poll the primary HVMF system for updates and to report events that affect the hypervolume operation. In the event a hypervolume component detects that the primary HVMF system is unavailable, it can report this event to the secondary HVMF system (if defined) which could trigger an event that causes the secondary HVMF system to become the new primary HVMF system for the affected hypervolume. The HVMF component may be identified by the system id of the component.

Each hypervolume component may be designated as either a primary or secondary component type. When secondary component types are defined, they can become the primary component type through user control directives or automatically when the primary component becomes unavailable. Hypervolume components may keep track of their current primary/secondary designation for the hypervolume. However, if told by the primary HVMF system that their role has changed, they may change their role to match that which is defined on the primary HVMF system.

Each hypervolume component may be designated as operating normally or in a damaged state. A hypervolume component may be marked as damaged when an event occurs that causes the hypervolume to become fractured and the affected component is unavailable and may therefore be marked as damaged and unable to continue to participate in the hypervolume operation. Once a hypervolume is marked as damaged, it may not participate in the hypervolume operation until corrective actions take place that allow it to become active in the hypervolume operation. These corrective actions may be dependent on the type of failure that occurred, the component that was affected, and what has occurred since the hypervolume was marked as fractured.

External Interface Design

This section will describe hypervolume component interfaces and their interaction in order to maintain hypervolume operation. Several typical hypervolume operation examples will be presented. However, these examples are for illustration purposes, and hypervolume component interfaces and their interaction are not limited to these examples. These examples show some of the message sequences going between hypervolume components to perform the desired goal. The diagrams show the hypervolume component designation at the top of the page. SHVMF stands for secondary hypervolume management facility component. PHVMF stands for primary hypervolume management facility component. PHVAP stands for primary hypervolume access point component. SHVAP stands for secondary hypervolume access point component. PPV stands for primary physical volume component. SPV stands for secondary physical volume component. Exemplary message designation patterns used are shown below:

PHVMF->SHVMF.ctlr.req. =control request message from PHVMF to SHVMF.
PHVMF->SHVMF.ctlr.resp. =control response message from PHVMF to SHVMF.
PHVMF->PHVAP.ctlr.req. . . . =control request message from PHVMF to PHVAP.
PHVMF->PHVAP.ctlr.resp. =control response message from PHVMF to PHVAP.
PHVMF->SHVAP.ctlr.req. . . . =control request message from PHVMF to SHVAP.
PHVMF->SHVAP.ctlr.resp. =control response message from PHVMF to SHVAP.
PHVMF->PPV.ctlr.req. . . . =control request message from PHVMF to PPV.
PHVMF->PPV.ctlr.resp. . . . =control response message from PHVMF to PPV.
PHVMF->SPV.ctlr.req. . . . =control request message from PHVMF to SPV.
PHVMF->SPV.ctlr.resp. . . . =control response message from PHVMF to SPV.

And so on . . . Generally, they may represent the message source component, destination component, type (e.g., control, io), request/response designation, then the message type designation, which may give a brief description of the message purpose. In the diagrams, time will increase from top to bottom making the message flow from top to bottom. These diagrams assume an error free communications network and represent a best case flow of messages.

The first hypervolume operation example may be processing a request to define a hypervolume. For purposes of illustration, this process assumes that only one physical volume is defined initially for the hypervolume. It also assumes that the physical volume used for the hypervolume is currently mapped to a server. This is illustrated in FIG. 10.

The hypervolume definition may occur through a user interface provided by the PHVMF system that is defined for the hypervolume. Thus, the PHVMF for the hypervolume being defined may be the central system driving the creation of the hypervolume by all of the specified components. In this example, a SHVMF may be specified for the hypervolume, so following the PHVMF system saving the hypervolume definition information in its local database, the first step may be to mirror the hypervolume definition information to the SHVMF from the PHVMF. Once this completes, the PHVMF may send a message to the specified PHVAP system requesting the creation of a new hypervolume on that system. In this example, the PPV component of the hypervolume may be located on the same system as the PHVAP component. The PHVAP component may recognize that the specified PPV is mapped to a server, so it may send a request to the PHVMF component requesting that the hypervolume being created be registered to be mapped to the server currently mapped to the physical volume. Assuming that the PHVMF allows the mapping of the hypervolume to the server, it then may send this mapping registration to the SHVMF and then reply to the PHVAP acknowledging the mapping of the hypervolume to the server. If more than one server was mapped to the volume, then each server may register use of the new hypervolume. If any of the server mappings to the hypervolume fail, the PHVAP may terminate the hypervolume creation with an error and may require either the user to allow access to the hypervolume being created by all servers currently mapped to the volume or to unmap any servers that will not be allowed access to the new hypervolume. Once the server mapping has occurred successfully, the PHVAP component may establish a PHVAP->PPV session to issue server I/O with. When this completes successfully, the PHVAP may respond back to the PHVMF hypervolume create message that the hypervolume has successfully been created. The storage system which hosts the PHVAP and PPV components of the hypervolume may identify that the hypervolume created has components hosted by the system, the physical volume may now be used as a physical volume for this hypervolume, the server(s) that used to be mapped to the physical volume may now be mapped to this hypervolume, and that the hypervolume has the specified PHVMF and SHVMF components defined so that it can reference these systems when necessary to get the current state/configuration of the hypervolume when needed. Assuming the server(s) are running I/O requests to the physical volume while the hypervolume creation is being processed, at some point the logic may halt incoming I/Os, wait for all outstanding I/Os to complete, make the necessary mapping changes and other changes to put the new hypervolume into service, and then continue processing I/Os from the server(s) using the newly created hypervolume. One note that was mentioned earlier in this document was that the user id, system id initiating the action, and an action id may be included in all messages sent that pertain to the same hypervolume operation. So, the user id that created the hypervolume may be included in all packets shown in FIG. 10, the system id of the PHVMF system may also be included, and an action id generated by the PHVMF system may also be included in all of the messages shown. Log messages generated during the processing of this operation may include this information. While the create hypervolume process is running, it may register this process (and all hypervolume processes) on the SHVMF component in case the PHVMF component fails so that the SHVMF could take over in the middle of processing this action.

Figure 10:
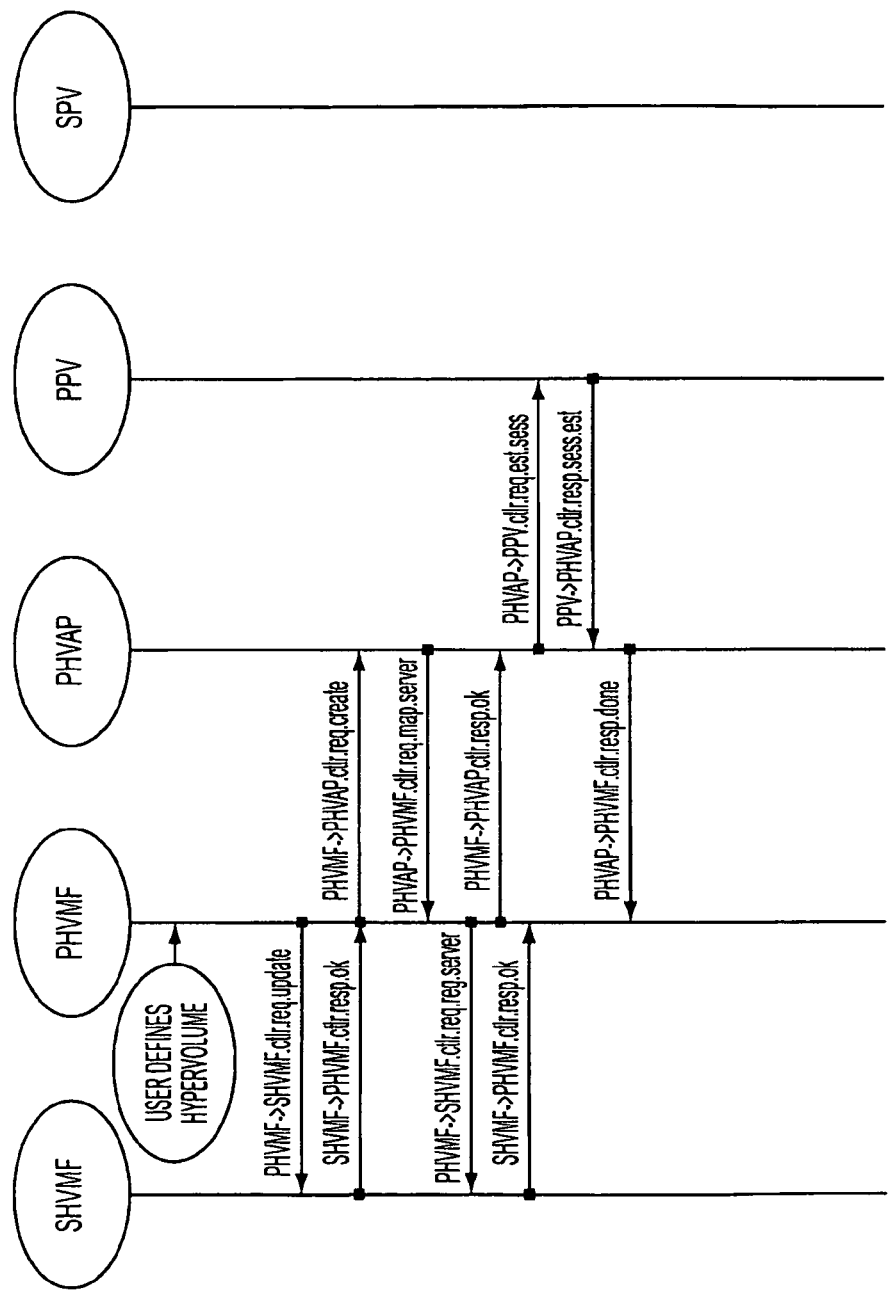
FIG. 10 illustrates processing a request to define a hypervolume in accordance with another embodiment of the present disclosure.
Figure 11:
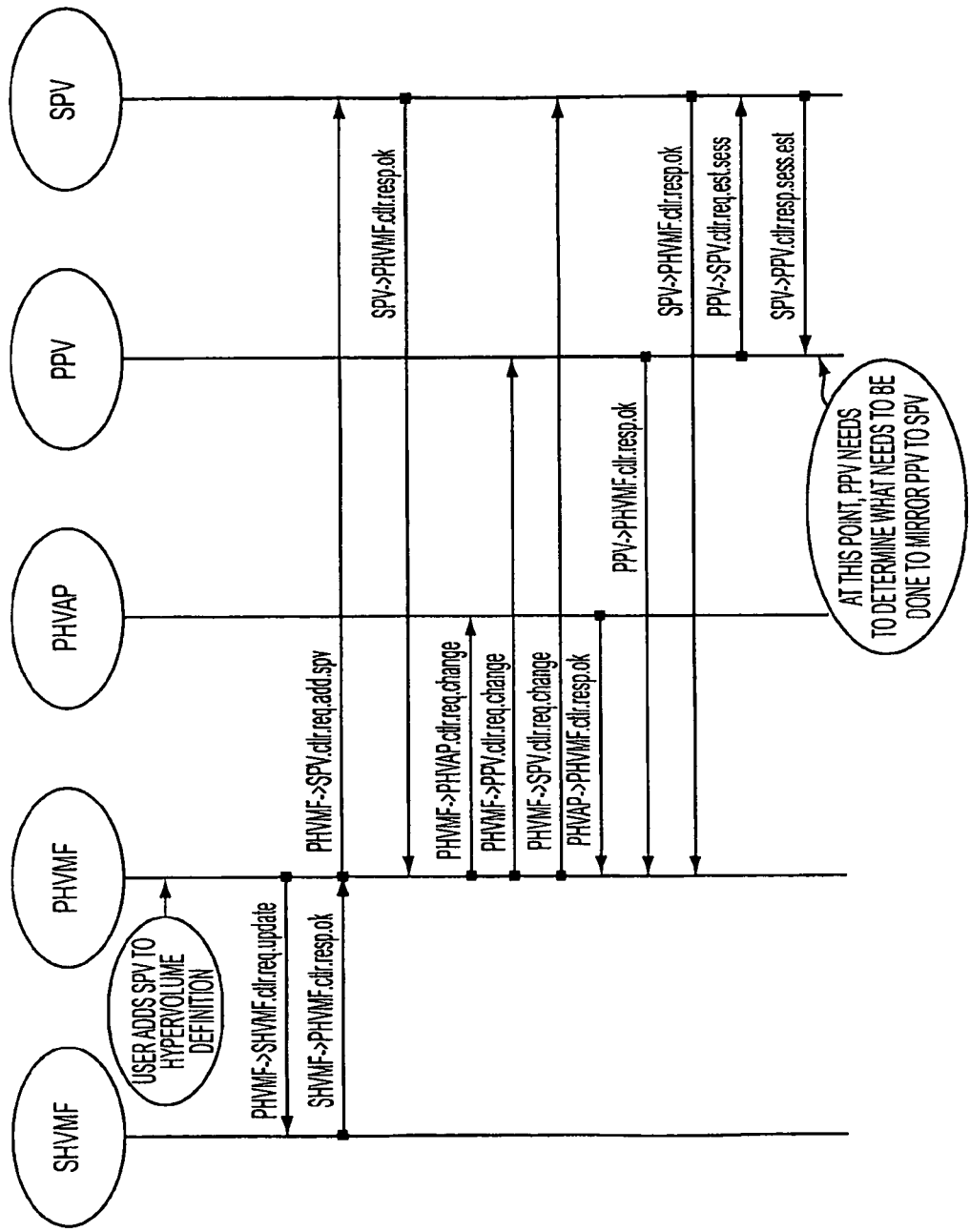
FIG. 11 illustrates a process of adding a secondary physical volume to a hypervolume in accordance with a further embodiment of the present disclosure.

The next hypervolume operation example may show the process of adding a secondary physical volume on another storage system to the hypervolume that was created in FIG. 10 above. This is shown in FIG. 11.

In this example, it may be assumed that a user adds the SPV to the previously defined hypervolume through the PHVMF user interface. The PHVMF may save this change to its local hypervolume definition and then mirror this change to the SHVMF defined for the hypervolume. It may then send a message to the system hosting the SPV being added to the hypervolume definition. This may cause the SPV host system to check that the specified volume exists, that it is not mapped to any servers, and that the size of the volume is greater than or equal to the hypervolume size. If any of these checks fail, the SPV host system may send an error message in response to the request specifying the reason for the error and the operation to add the SPV to the hypervolume definition may fail. This may cause the PHVMF to remove the SPV from the hypervolume definition and then send the hypervolume definition update to the SHVMF and terminate the operation. If the add.spv request succeeds, a successful response may be sent to the PHVMF which may cause the PHVMF to send a hypervolume update message to the PHVAP, PPV, and SPV components. In one embodiment, this change may only be significant to the PPV component, which may begin the process of mirroring the PPV to the SPV as specified by the user when adding the SPV to the hypervolume definition.

This may cause the PPV component to establish a session with the SPV component to replicate the PPV data to the SPV. Once this session is established, the PPV component may determine the state of the SPV component with respect to the PPV component since it may be possible that the SPV component is already a replication of the PPV component as a result of a previous replication operation. In this event, the PPV/SPV components may recognize this and determine where the mirroring/replication of the PPV to SPV shall continue. In the event there is no prior association between the PPV and SPV components, the PPV may begin copying the entire volume over to the SPV. The PPV/SPV components may checkpoint the mirroring/replication process in case an event occurs which interrupts it before finishing, and the process may continue on, when possible, without requiring it to start over from the beginning.

Figure 12:
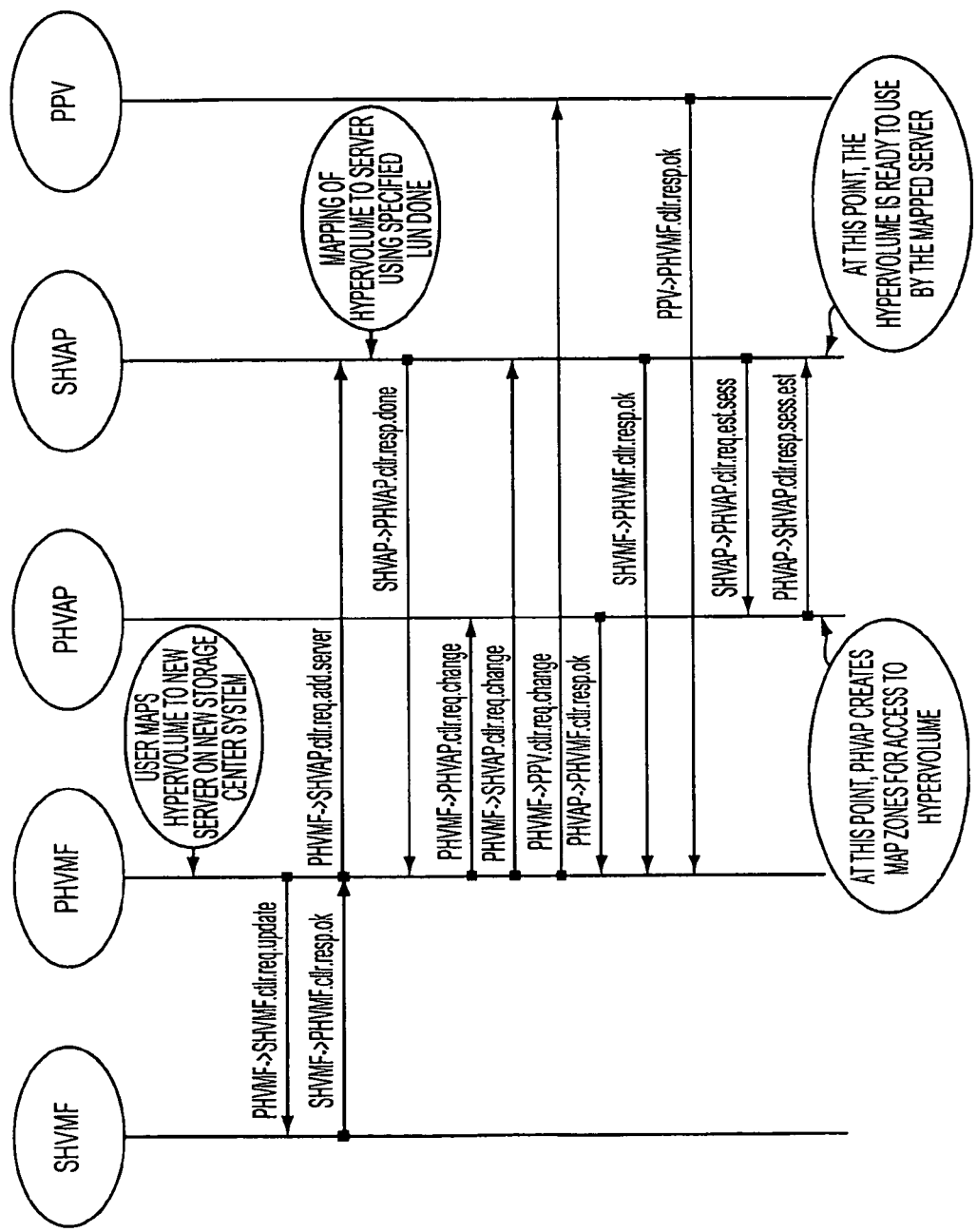
FIG. 12 illustrates processing of assigning a hypervolume to a server on a different storage system in accordance with yet another embodiment of the present disclosure.

The next hypervolume operation example may show the processing of assigning the hypervolume from the previous examples to a server on another storage system. This may cause a new SHVAP component to be added to the hypervolume definition and register a new server mapping to the hypervolume use. This example is shown in FIG. 12.

This example may assume that the server mapping to the hypervolume is initiated on the PHVMF system of the hypervolume. Other methods to map the hypervolume to the server may add steps prior to the starting point of this example. In such cases, the other methods may result in the PHVMF component for the hypervolume being notified of the operation, and then this same process could begin as presented.

The PHVMF component may process the map request and check if the mapping is allowed based on the access limits set up by the hypervolume definition. If the access limits did not allow the requested mapping, the request may end. When the request is allowed, the PHVMF may add the new SHVAP component to the hypervolume definition and add the server mapping to the hypervolume use register. It may then mirror these changes over to the SHVMF system. Next, it may send a request to the storage system mapping the hypervolume to the server requesting that the mapping to the server take place. In one embodiment, this request may specify the hypervolume id, the server id, the port on the storage system where the mapping is to occur, and the LUN number to map the hypervolume to. The storage system may process this request, and if any problems are encountered, the request may be denied with an error. A reason code may provided in the response message specifying why the operation was denied. If this occurs, the PHVMF may remove the component from the hypervolume definition, remove the server mapping registration and update the SHVMF with these changes, and terminate the operation to the user with the appropriate error.

Assuming the mapping takes place without error, a successful response back to the PHVMF system may cause the PHVMF to send hypervolume change notices to all hypervolume component systems indicating the changes to the hypervolume. The PHVAP component may desire to know this change so that when the SHVAP->PHVAP session request is received, it knows to allow the request. At some point in the processing of this operation, the SHVAP component may send a message to the PHVAP component to establish a session that can be used by the SHVAP component to issue server I/O requests to be processed for the hypervolume. The receiving PHVAP system may process this request and set up the environment to handle this request. The response message to the SHVAP may indicate the success of this session and may include all information to the SHVAP component necessary to send server I/O requests to be processed for the hypervolume. It could also include the device reservation state of the hypervolume. Once this session has been established successfully, the SHVAP system can forward server I/O requests to the PHVAP component system to be processed. Note that, in one embodiment, other than processing the change notice from the PHVMF, the change may not affect the PPV component of the hypervolume. However, it may need to know this information at a later point in time if the SHVAP component becomes the PHVAP component and requests a PHVAP->PPV session to be established. It may be different for each implementation whether this information will be maintained on each system hosting a hypervolume component or whether to make a request to the PHVMF component when this information is needed to insure that the most recent information is used.

Figure 13:
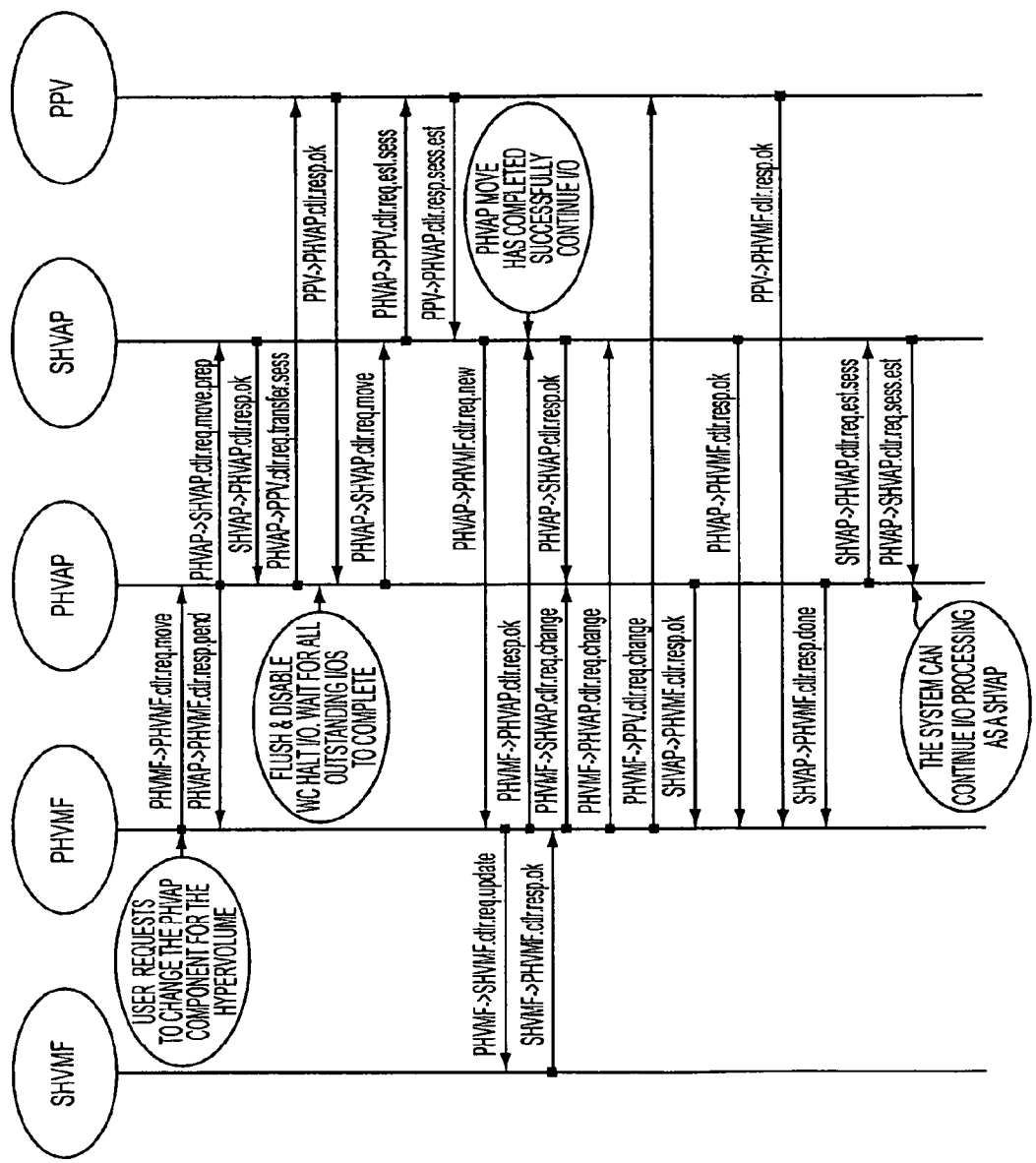
FIG. 13 illustrates movement of a primary hypervolume access point component for a hypervolume in accordance with an embodiment of the present disclosure.

The next hypervolume operation example may show the movement of the PHVAP component for the hypervolume defined above. This is shown in FIG. 13. This example may start with a user issuing a control directive through the PHVMF user interface to change the PHVAP component definition for the hypervolume. The PHVMF may perform some verification on the request prior to initiating the move in the system. The PHVMF may save this change in its hypervolume definition database at this time. A decision may be made as to what point this type of change gets saved. For this example, we may delay saving the change until it has become effective in the system. Because this action may affect the PHVAP/SHVAP components, the PHVMF may first send a move request message to the current PHVAP component system requesting the PHVAP component to be moved to the SHVAP component (the SHVAP component may be specified in configurations where more than one SHVAP component was defined). Because this operation may take a long period of time to complete, the PHVAP may send a response message back to the PHVMF indicating the requested operation is pending. The PHVAP component may then send a move prepare message to the SHVAP component that is to become the new PHVAP component. A purpose of this message may be to check if there is any condition existing at the SHVAP host system that precludes it from becoming the PHVAP component for the hypervolume. If the impending move was not allowed by the SHVAP system, the response message could indicate the reason, may cause the PHVAP to return an error back to the PHVMF system, and may cause the move process to be aborted. However, in this example the response is good, allowing the move operation to continue. The PHVAP system may then disable write-cache if necessary and may drain any data from the write-cache to insure that all data cached on the current PHVAP system is written to the PPV before the move takes place. The PHVAP may also halt all incoming I/Os to the hypervolume and waits for all outstanding I/Os to the PPV to complete. When this completes, the PHVAP may notify the PPV that the PHVAP->PPV session is going to be transferred. When the PPV system receives this message, it may terminate the current PHVAP->PPV session and save the specified new PHVAP component system id, waiting for the new PHVAP system to request the PHVAP->PPV session to be established. The PPV system may then send a successful response to the PHVAP.

Once this response is received by the PHVAP system, it may send a move request message to the new incoming PHVAP system requesting the move take place. Before the new PHVAP system responds back to this request, it may request a PHVAP->PPV session to be established with the PPV. At this time, the PPV may honor this request, set things up to service I/O requests from the new PHVAP component, and then send a successful response back to the requester. Once this completes successfully, the new PHVAP component may send a notification request to the PHVMF system indicating that it is now the new PHVAP component for the hypervolume. In one embodiment, this may be the point in the process where the move change can be recorded by the PHVMF system and the change mirrored to the SHVMF system as shown in the diagram. The PHVMF system may then send a successful response back to the new PHVAP component, which may cause the new PHVAP component to go into service and begin processing server I/O requests and/or establish session requests from SHVAP components in the system. It may also send a successful completion response back to the move request from the outgoing PHVAP system. While this is occurring, the PHVMF may send out change notifications to all hypervolume component systems indicating the new hypervolume configuration. Receipt of this change notification can cause SHVAP component system to begin the process of establishing a new SHVAP->PHVAP session to the new PHVAP component to send server I/Os with. Once this completes, server I/Os can begin to be processed through the new PHVAP component. At some point in this process, the outgoing PHVAP component system may send a successful completion response message to the PHVMF system indicating the move request has completed processing on the outgoing PHVAP system. This can be used to close down the control directive processing by the PHVMF component and give the completion message back to the initiating user. Once the new SHVAP->PHVAP session is established by the outgoing PHVAP system, server I/Os can be forwarded to the new PHVAP component for processing. While this move operation is being processed, if the outgoing PHVAP system receives any server I/Os to process from SHVAP systems, it may send a busy response back, which may indicate the request cannot be processed because the system is busy working on some operation, or a specific error response, indicating the recipient system is no longer the PHVAP component.

Figure 14:
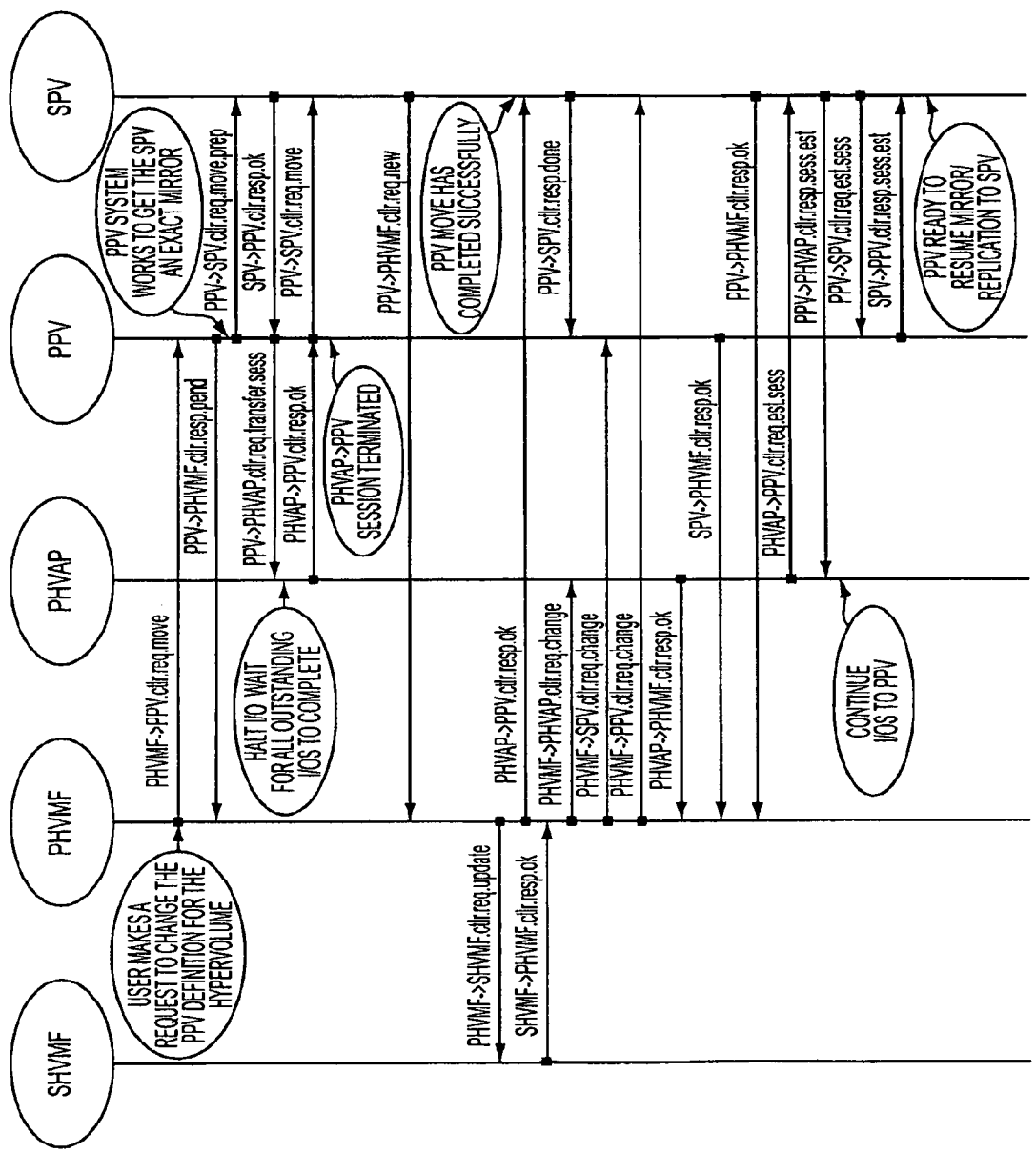
FIG. 14 illustrates processing of a move primary physical volume operation for a hypervolume in accordance with another embodiment of the present disclosure.

The next hypervolume operation example may show the processing of a move PPV operation for the hypervolume discussed above. This is shown in FIG. 14. This example may begin with a user request to move the PPV component of the hypervolume. For this example, we may assume that the user request was processed through the user interface of the PHVMF system. We may also continue to assume, for one embodiment, that these types of operations will not get recorded in the hypervolume definition database until the change has completed successfully. The PHVMF may send a move PPV request to the current PPV component system indicating the SPV component to make as the new PPV component for the hypervolume. If conditions exist at the PPV component system that would preclude allowing this request to be processed, an error response may be sent back by the PPV system. One condition, for example, that could preclude this change may be that the mirroring/replication session to the specified new PPV component is out of service, providing the environment where the two physical volumes cannot become exact copies for an unknown time period. However, for this example, the current PPV may be mirroring the data out to the SPV in a normal fashion, so the PPV system may send an operation pending response back to the PHVMF system indicating the request is being processed. The PPV system may then work to get the specified new PPV completely mirrored with the current PPV. This may take a very long time, depending on the state of this replication session. However, while this is being processed, the current PPV may remain in effect and server I/Os may continue to be processed.

When the current PPV and SPV are completely mirrored, the PPV may send a move prepare to the SPV system to determine if any conditions exist on the SPV system that preclude the movement of the PPV component of the hypervolume. If conditions exist that prevent the movement of the PPV component, this system may send an error response back to the PPV system indicating the reason for blocking the operation. For this example, this is not the case and the SPV system may send a successful response to the move prepare request message. The PPV system may then send a transfer session request to the PHVAP component, indicating the incoming PPV system id. This may cause the PHVAP component to halt incoming server I/Os to the hypervolume, wait for all outstanding I/Os to the PPV to complete, and then send a successful response to the PPV. Once this occurs, the PHVAP->PPV session may be terminated, both on the PHVAP system and the PPV system. The outgoing PPV system may send a move request message to the new incoming PPV system, which may begin the process on that system to assume the PPV component responsibilities. The new incoming PPV system may send a new PPV message to the PHVMF indicating the physical volume definition change. The PHVMF system may record this change in its local database and then mirror the change to the SHVMF system. It may then send a successful response back to the new incoming PPV system. At this point, in one embodiment, the move PPV has been made. The PHVMF system may send a change notification to all hypervolume components that may cause the PHVAP component to send an establish session to the new incoming PPV system to establish a new PHVAP->PPV session to use to forward server I/Os to the PPV component for processing. Once this session is successfully established, the PHVAP can continue forwarding server I/Os to the new incoming PPV component for processing. While this is occurring, the new PPV component may establish PPV->SPV sessions with all SPV components in the system and then establish mirroring/replication sessions as defined by the HVMRS for the hypervolume.

In this example, the SHVAP component of the hypervolume is not illustrated. This was due to limitations in space to display the operations being performed. Additionally, in one embodiment, the SHVAP component may not be affected by the operation. In one embodiment, the only participation of the SHVAP component in the processing of this event may include the receipt of the change notification message from the PHVMF.

In hypervolume configurations where more than two physical volumes are defined, a challenge may exist when moving the PPV component to deal with the possibility of mirroring/replication sessions between the PPV and two or more SPV components being in different states when the move operation is processed. One approach may be to require all PPV->SPV replication sessions to be exact mirrors before allowing the move to take place. While, in one embodiment, this may solve the problem, it may also limit the use of this operation and could cause the move operation to never take place if one of the SPV components was out of service or unavailable.

Figure 15:
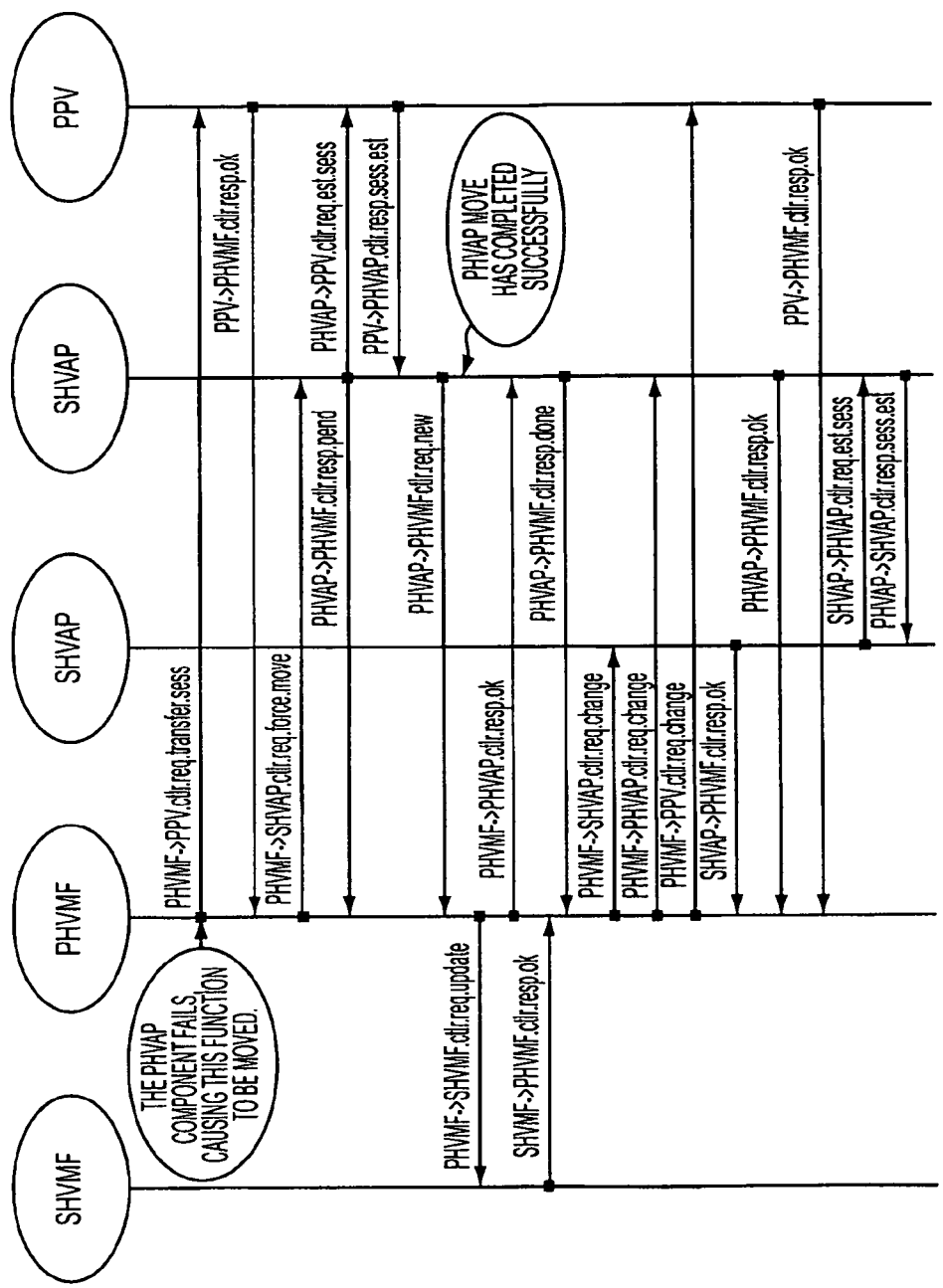
FIG. 15 illustrates processing of a primary hypervolume access point failure event in accordance with a further embodiment of the present disclosure.

For this reason, in a further embodiment, it may be desirable to limit the maximum number of physical volumes allowed for a hypervolume to be two. For the next hypervolume operation example, we may assume that another SHVAP component has been added to our hypervolume definition, causing one PHVAP and two SHVAP components to be defined. This next example may show the processing of a PHVAP failure event, forcing the movement of the PHVAP component. This is shown in FIG. 15 below.

This example discusses the complete failure of the PHVAP component, not a controller failure, which may failover to a surviving controller. This example may begin with the recognition of the complete failure of the PHVAP component of the hypervolume. This could occur, for example, by the PHVMF directly or from events sent to the PHVMF system from SHVAP components. Regardless of the method, the PHVMF system may determine the component has failed and may begin the process of forcing the PHVAP component to be moved to a surviving SHVAP component so that the hypervolume can continue to be used as best as possible. Once the PHVMF system determines which SHVAP component is to assume the new PHVAP role, it may send a transfer session request message to the PPV component of the hypervolume. This example may assume that the PPV component is hosted on a different system then the PHVAP component. One purpose of this request message may be to prepare the PPV to allow a new PHVAP->PPV session to be established with the new incoming PHVAP component. This may cause the PPV system to terminate its PHVAP->PPV session, effectively halting use of the PPV component by the current PHVAP component. It may send a successful response back to the PHVMF when this has completed.

The PHVMF may send a force move request message to the SHVAP component that is to become the new PHVAP component for the hypervolume. This system may send a pending response indicating the request is being processed. The new PHVAP component may send an establish session request message to the PPV component to establish a PHVAP->PPV session to issue server I/Os with. Because the PPV was notified of the impending change, it may establish the new session and return a successful response to the request. The new PHVAP component may then send a new PHVAP request message to the PHVMF system indicating it is now the PHVAP for the hypervolume. The PHVMF may save this change in its local database and mirrors the changes to the SHVMF system. It may send a successful response back to the PHVAP system, which may then send a successful completion response message to the PHVMF for the force move request. While this is occurring, the PHVMF may send change notification messages to all hypervolume components indicating the new configuration. This may cause all SHVAP components to send establish session request messages to the new PHVAP component to establish SHVAP->PHVAP sessions to forward server I/Os to the PHVAP component for processing. Once this is done, the hypervolume can begin processing server I/O. Note that for one embodiment, if write-cache was enabled at the hypervolume level it may be possible that data will be lost for the hypervolume due to the failure of the PHVAP component. When the failing PHVAP component becomes operational again, it may check with the hypervolume PHVMF component before going back into service to get the current state of the hypervolume. If the PHVAP component has been moved while it was out of service and there was hypervolume data left in its write-cache, the system may purge this data without writing it out to the physical volume. This example may assume that the hypervolume is configured to automatically move the PHVAP component when a complete failure of the PHVAP is detected. In some embodiments, this may not be desirable, and this function may be defined by the user for each hypervolume defined.

Many more examples could be included here and are within the scope of this disclosure. The examples presented herein should help show how the hypervolume components may interact with each other.

The feature name, i.e., hypervolume, used herein was chosen to provide a term that could be used to identify the new concept. This term is not meant to cause confusion with any other term in the art.

Although the present invention has been described with reference to preferred embodiments, persons skilled in the art will recognize that changes may be made in form and detail without departing from the spirit and scope of the invention.

For example, in one embodiment, the id given to servers for a hypervolume may be the same regardless of which storage system the hypervolume is accessed through. This is different then how volume ids are generated for current volumes. This may utilize a global id method. The id referred to here may include what is given back to servers in response to INQUIRY or other SCSI commands that provide a unique identifier of the device.

In further embodiments, users may be able to schedule snapshots for hypervolumes. In another embodiment, hypervolume snapshots may differ from physical volume snapshots in that they may be initiated on the current PHVAP system but actually taken on the PPV followed by any SPV systems. Because of this, hypervolume snapshots may be initiated from different systems at different points in time as the PHVAP component moves from system to system. The PHVAP system may drain write-cache if necessary, halt incoming I/Os to the hypervolume, and initiate the PPV system to take a snapshot. Snapshots may also be taken at this time of SPV systems associated with the hypervolume.

Hypervolume device reservation processing may also be provided. In one embodiment, the PHVAP component may be the location where hypervolume device reservations will be managed. SHVAP components may send device reservations made from servers to the PHVAP component to be processed. The method to support hypervolume device reservations may determine whether all SHVAP components may be notified when a hypervolume is reserved/released or not. While a hypervolume is reserved, certain commands received from other servers accessing the hypervolume may have a reservation conflict status returned to properly support the device reservation processing.

In one embodiment, the system may not allow the deletion of a hypervolume if any servers are mapped to it.

In other embodiments, there may be some common configurations where templates could be created to assist users in the use of hypervolumes for specific environments.

The creation of a hypervolume may require one or more new physical volumes to be defined for use by the hypervolume. Functionality may be added to automatically create physical volumes of the proper size on the specified systems for use by the hypervolume when creating it. Similarly, an enhancement could create and add a new physical volume command to an existing hypervolume, allowing a one step operation to add a new physical volume to a hypervolume definition.

In one embodiment, hypervolume components operating on a failed controller may failover to a surviving controller and continue operation. In general, logic may be added to identify hypervolume components that were functioning on the failed controller. Furthermore, logic may be added to determine the current state of each component, reestablish their role, and continue on with the operation. While hypervolume processes are executing (like a PHVAP move operation), failure of a controller involved in that process may be challenging to deal with. The distributed nature of hypervolume components can be utilized to identify some unique methods to address all of the cases that can occur.

In one embodiment, a common hypervolume control directive may be utilized to move both the PHVAP and PPV components from one system to another. This may be done when the use of the hypervolume data would switch from a production data center to a disaster recovery data center (and back). It may be desirable to include a control directive to move both components together in one operation.

In configurations where a large number of hypervolumes are in use, it may be desirable to issue control directives that affect many hypervolumes concurrently. For example, a number of hypervolumes may be configured in a classic disaster recovery mode where two storage systems (one at data center A and one at data center B) may be used to configure hypervolumes that can move from one data center to another. A control directive given to a HVMF system requesting the PHVAP component for all hypervolumes be moved from A to B may be useful. This may be done by associating hypervolume components with systems and providing control operations directed at these systems that may affect all hypervolume components associated with that system. This method could also be used when making automatic hypervolume component changes when a component fails. If a number of hypervolumes have components on system X, and system X fails, decisions may be made on what to do with each of those components.

In other embodiments, snapshots associated with a Data Instant Replay feature, such as disclosed in U.S. patent application Ser. No. 10/918,329, filed Aug. 13, 2004 and titled "Virtual Disk Drive System and Method" previously hereby incorporated by reference herein, may be performed and managed at the physical volume level, but may also relate to the hypervolume level. The scheduling of snapshots may move when the PPV component of a hypervolume moves.

We claim:

1. A data storage system comprising:
 a first data storage center comprising two or more physical data storage devices and having a first volume defined from the two or more physical data storage devices of the first data storage center;
 a first server communicatively coupled with the first data storage center, the first data storage center receiving input/output (I/O) requests from the first server;
 a second data storage center comprising two or more physical data storage devices and having a second volume defined from the two or more physical data storage devices of the second data storage center;
 a second server communicatively coupled with the second data storage center, the second data storage center receiving I/O requests from the second server; and
 a hypervolume to which the first and second volumes are associated, and which directs I/O requests from the first and second servers, received via the first and second data storage centers, respectively, to a first one of the first and second volumes, designated as a primary volume;
 wherein data stored to the primary volume as a result of the I/O requests is replicated to the other of the first and second volumes, designated as the secondary volume; and wherein the designations of primary volume and secondary volume are automatically switched, by the data storage system via the hypervolume, between the first and second volumes, based on amounts of server I/O received via each of the data storage centers, so as to determine to which volume I/O requests are directed and to which volume replicated data is directed at any given time.

2. The data storage system of claim 1, wherein the first and second data storage centers are located in different physical locations.

3. The data storage system of claim 1, wherein data stored to the primary volume as a result of the I/O requests is replicated to the secondary volume using asynchronous replication.

4. The data storage system of claim 1, wherein data stored to the primary volume as a result of the I/O requests is replicated to the secondary volume using synchronous replication.

5. The data storage system of claim 1, wherein the designations of primary volume and secondary volume are additionally switched by the data storage system via the hypervolume when the primary volume is taken out of service.

6. A method for operation of a data storage system, wherein the data storage system comprises:
a first data storage center comprising two or more physical data storage devices and communicatively coupled with a first server, the first data storage center receiving input/output (I/O) requests from the first server; and
a second data storage center comprising two or more physical data storage devices and communicatively coupled with a second server, the second data storage center receiving I/O requests from the second server;
the method of operation comprising:
providing a first volume at the first data storage center and defined from the two or more physical data storage devices of the first data storage center;
providing a second volume at the second data storage center and defined from the two or more physical data storage devices of the second data storage center;
associating a hypervolume with the first and second volumes;
via the hypervolume, directing I/O requests from the first and second servers, received via the first and second data storage centers, respectively, to a first one of the first and second volumes, designated as a primary volume;
replicating data stored to the primary volume as a result of the I/O requests to the other of the first and second volumes, designated as the secondary volume; and
automatically switching, via the hypervolume, the designations of primary volume and secondary volume between the first and second volumes, based on amounts of server I/O received via each of the data storage centers, so as to determine to which volume I/O requests are directed and to which volume replicated data is directed at any given time.

7. The method for operation of a data storage system of claim 6, wherein the first and second data storage centers are located in different physical locations.

8. The method for operation of a data storage system of claim 6, wherein data stored to the primary volume as a result of the I/O requests is replicated to the secondary volume using asynchronous replication.

9. The method for operation of a data storage system of claim 6, wherein data stored to the primary volume as a result of the I/O requests is replicated to the secondary volume using synchronous replication.

10. The method for operation of a data storage system of claim 6, wherein the designations of primary volume and secondary volume are additionally switched via the hypervolume when the primary volume is taken out of service.

11. A hypervolume class of data volume storage presented by a data storage system comprising:
a first data storage center comprising two or more physical data storage devices and communicatively coupled with a first server, the first data storage center receiving input/output (I/O) requests from the first server; and
a second data storage center comprising two or more physical data storage devices and communicatively coupled with a second server, the second data storage center receiving I/O requests from the second server;
the hypervolume comprising:
a first volume at the first data storage center and defined from the two or more physical data storage devices of the first data storage center; and
a second volume at the second data storage center and defined from the two or more physical data storage devices of the second data storage center;
wherein the hypervolume directs I/O requests from the first and second servers, received via the first and second data storage centers, respectively, to a first one of the first and second volumes, designated as a primary volume;
wherein data stored to the primary volume as a result of the I/O requests is replicated to the other of the first and second volumes, designated as the secondary volume; and
wherein the designations of primary volume and secondary volume are automatically switched, via the hypervolume, between the first and second volumes, based on amounts of server I/O received via each of the data storage centers, so as to determine to which volume I/O requests are directed and to which volume replicated data is directed at any given time.

12. The hypervolume of claim 11, wherein the first and second data storage centers are located in different physical locations.

13. The hypervolume of claim 11, wherein data stored to the primary volume as a result of the I/O requests is replicated to the secondary volume using asynchronous replication.

14. The hypervolume of claim 11, wherein data stored to the primary volume as a result of the I/O requests is replicated to the secondary volume using synchronous replication.

15. The hypervolume of claim 11, wherein the designations of primary volume and secondary volume are additionally switched by the hypervolume when the primary volume is taken out of service.

* * * * *